(12) United States Patent
Hirano et al.

(10) Patent No.: US 12,441,365 B2
(45) Date of Patent: Oct. 14, 2025

(54) AUTOMATED DRIVING VEHICLE AND TRAFFIC SAFETY SUPPORT SYSTEM

(71) Applicants: HONDA MOTOR CO., LTD., Tokyo (JP); Honda Research Institute Europe GmbH, Offenbach/Main (DE)

(72) Inventors: Ryohei Hirano, Saitama (JP); Akihito Kimata, Saitama (JP); Junta Ochiai, Saitama (JP); Tim Puphal, Offenbach/Main (DE)

(73) Assignees: HONDA MOTOR CO., LTD., Tokyo (JP); Honda Research Institute Europe GmbH, Offenbach/Main (DE)

( * ) Notice: Subject to any disclaimer, the term of this patent is extended or adjusted under 35 U.S.C. 154(b) by 243 days.

(21) Appl. No.: 18/192,664

(22) Filed: Mar. 30, 2023

(65) Prior Publication Data

US 2024/0326866 A1  Oct. 3, 2024

(51) Int. Cl.
*B60W 60/00* (2020.01)
*B60W 40/04* (2006.01)
*G08G 1/0967* (2006.01)

(52) U.S. Cl.
CPC ........ *B60W 60/0015* (2020.02); *B60W 40/04* (2013.01); *G08G 1/096725* (2013.01); *B60W 2556/45* (2020.02)

(58) Field of Classification Search
CPC ............ B60W 60/0015; B60W 40/04; B60W 2556/45; G08G 1/096725; G08G 1/0104; G08G 1/08; G08G 1/096805
See application file for complete search history.

(56) References Cited

U.S. PATENT DOCUMENTS

| 12,304,527 B2* | 5/2025 | Yasui | B60W 60/0011 |
| 2006/0229792 A1* | 10/2006 | Kawazoe | B60W 40/04 |
| | | | 701/532 |
| 2012/0029798 A1* | 2/2012 | Miller | G08G 1/096783 |
| | | | 701/117 |
| 2015/0371518 A1* | 12/2015 | Mittal | G08B 21/182 |
| | | | 340/539.11 |
| 2020/0070834 A1* | 3/2020 | Mizoguchi | G08G 1/0125 |

(Continued)

FOREIGN PATENT DOCUMENTS

| JP | 2007293388 A | 11/2007 |
| JP | 6399453 B2 | 10/2018 |

*Primary Examiner* — Jason Holloway
*Assistant Examiner* — Madison B Emmett
(74) *Attorney, Agent, or Firm* — CKC & PARTNERS CO., LLC

(57) ABSTRACT

An automated driving vehicle 2a, 2b, 2c, 2d includes: an external information acquisition device configured to acquire external information regarding a state of surroundings of the automated driving vehicle as a vehicle of interest; an on-board communication device configured to receive a risk area notification regarding a high-risk area in a target traffic area 9a; an action plan formulation device configured to formulate an action plan for the vehicle of interest such that a behavior of the vehicle of interest is prevented from exceeding a predetermined behavior allowable range; and a travel control device configured to operate a travel actuator based on the action plan to cause the vehicle of interest to automatically travel. In a case where the vehicle of interest is moving within the high-risk area, the action plan formulation device sets the behavior allowable range to a range associated with the risk area notification.

13 Claims, 9 Drawing Sheets

(56) References Cited

U.S. PATENT DOCUMENTS

| | | | |
|---|---|---|---|
| 2020/0312129 A1* | 10/2020 | Oyama | G08G 1/096725 |
| 2021/0074160 A1* | 3/2021 | Skipp | B60W 50/085 |
| 2022/0388505 A1* | 12/2022 | Sharma Banjade | G08G 1/096783 |
| 2024/0071217 A1* | 2/2024 | Mattelaer | B60W 60/001 |
| 2024/0133701 A1* | 4/2024 | Nagata | G01C 21/3492 |
| 2024/0194059 A1* | 6/2024 | Huang | G08G 1/096741 |

* cited by examiner

FIG. 6

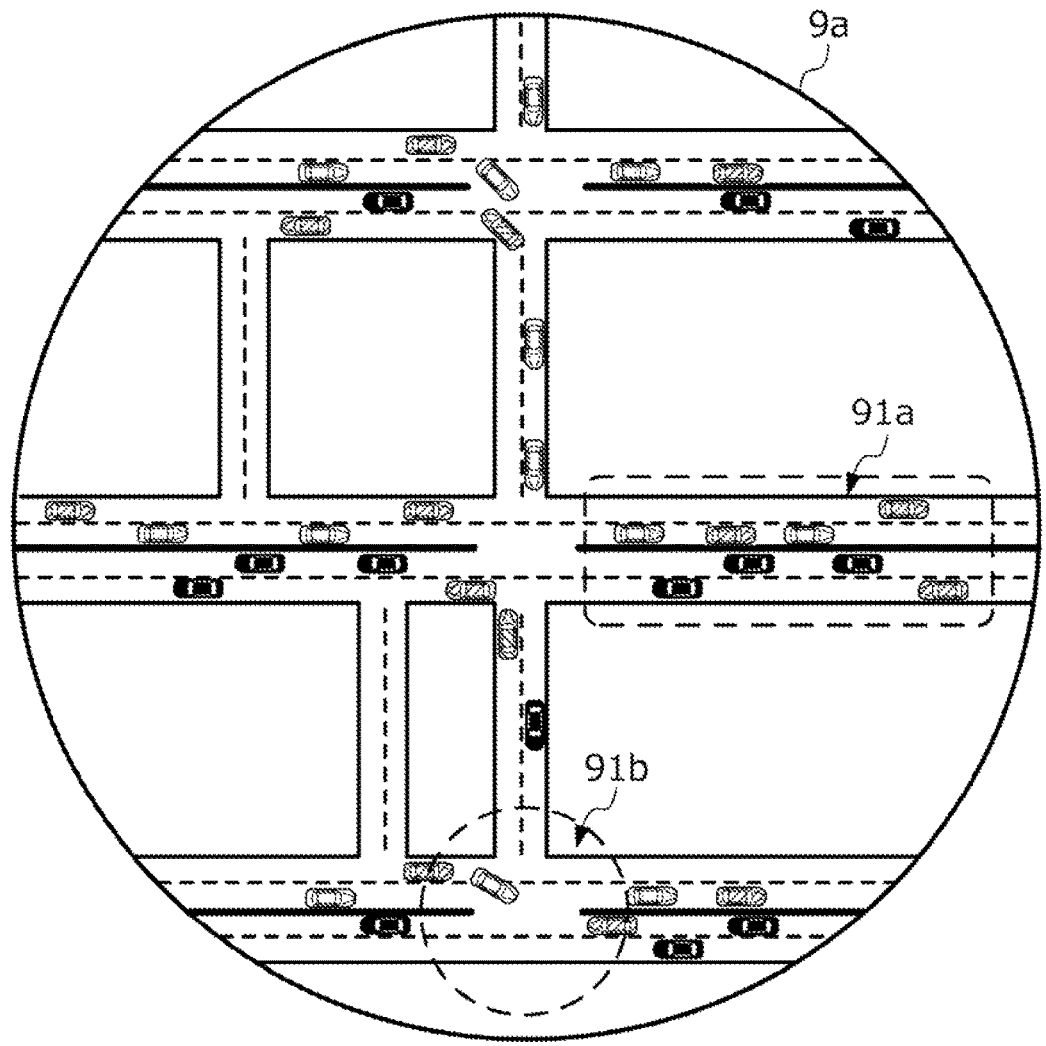

UPPER LIMIT ACCELERATION:
　　　+0.1G -> +0.1G
LOWER LIMIT ACCELERATION:
　　　-0.1G -> -0.1G
UPPER LIMIT SPEED: 50km/h -> 50km/h
LOWER LIMIT MARGIN TIME:　4s -> 4s
LANE CHANGE: PERMITED->PROHIBITED

UPPER LIMIT ACCELERATION:
　　　+0.2G -> +0.1G
LOWER LIMIT ACCELERATION:
　　　-0.2G -> -0.1G
UPPER LIMIT SPEED: 50km/h -> 50km/h
LOWER LIMIT MARGIN TIME:　3s -> 4s
LANE CHANGE: PERMITED->PROHIBITED

UPPER LIMIT ACCELERATION:
　　　+0.1G -> +0.1G
LOWER LIMIT ACCELERATION:
　　　-0.1G -> -0.1G
UPPER LIMIT SPEED: 70km/h -> 50km/h
LOWER LIMIT MARGIN TIME:　4s -> 4s
LANE CHANGE: PERMITED->PROHIBITED

UPPER LIMIT ACCELERATION:
　　　+0.3G -> +0.1G
LOWER LIMIT ACCELERATION:
　　　-0.3G -> -0.1G
UPPER LIMIT SPEED: 80km/h -> 50km/h
LOWER LIMIT MARGIN TIME:　3s -> 4s
LANE CHANGE: PERMITED->PROHIBITED

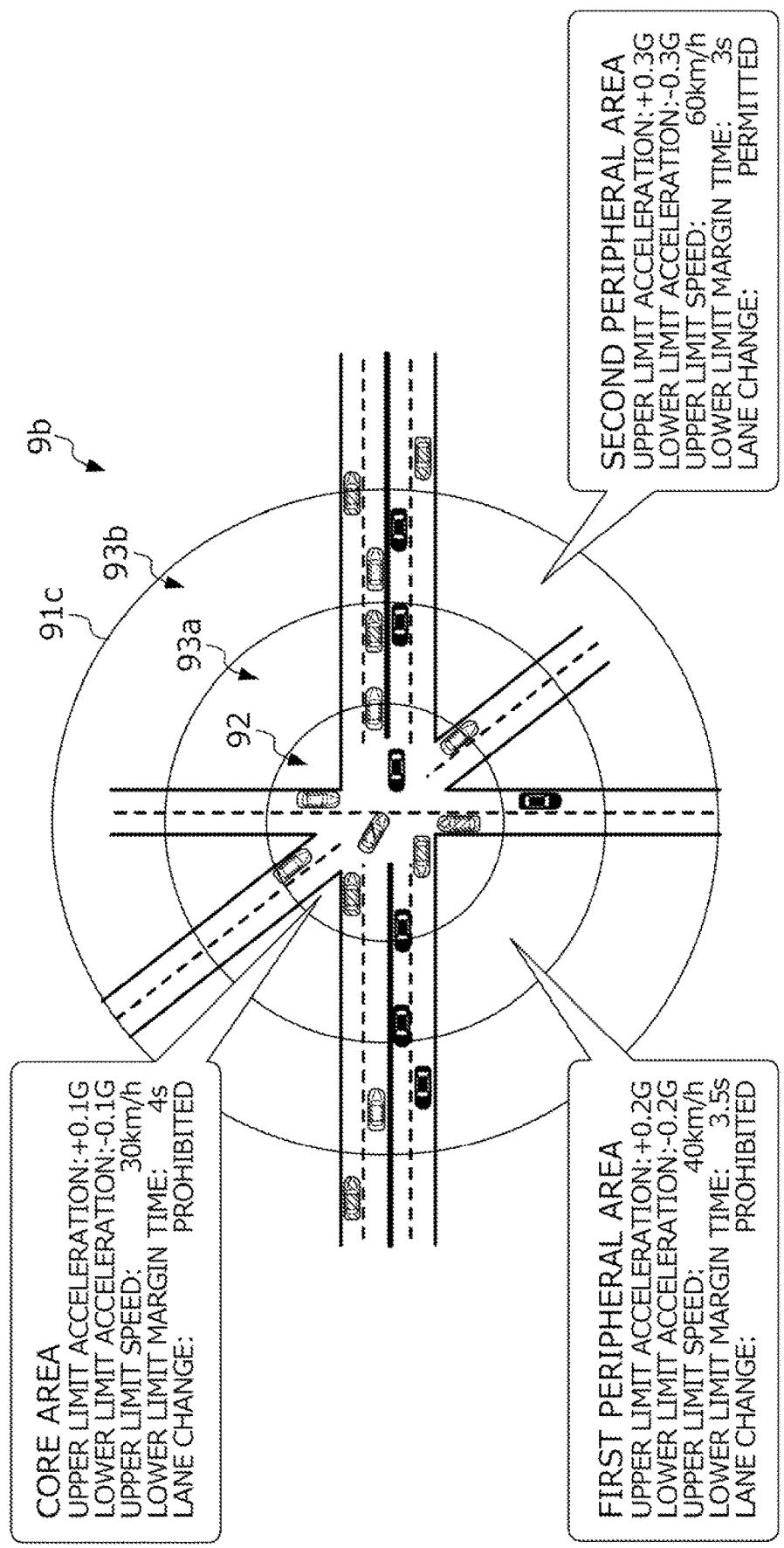

AUTOMATED DRIVING VEHICLE AND TRAFFIC SAFETY SUPPORT SYSTEM

BACKGROUND OF THE INVENTION

Field of the Invention

The present invention relates to an automated driving vehicle and a traffic safety support system. More specifically, the present invention relates to a traffic safety support system including an automated driving vehicle that automatically travels based on an action plan formulated so as to prevent the automated driving vehicle from exceeding a predetermined behavior allowable range, and a traffic management server communicatively connected to the automated driving vehicle.

Related Art

In recent years, endeavors have been actively made to provide access to a sustainable transport system that is considerate of people who are vulnerable among traffic participants. To realize the sustainable transport system, increasing effort is being devoted to research and development for further improvement in the safety and convenience of traffic via research and development for automated driving technologies (for example, see Japanese Unexamined Patent Application, Publication No. 2007-293388 and Japanese Patent No. 6399453).

Patent Document 1: Japanese Unexamined Patent Application, Publication No. 2007-293388
Patent Document 2: Japanese Patent No. 6399453

SUMMARY OF THE INVENTION

Many automated driving vehicles are equipped with a travel control device, which operates a travel actuator to cause the vehicle to automatically travel while making the vehicle move in accordance with an action plan formulated by a computer such that the vehicle complies with laws and traffic safety is ensured. However, the details of algorithm for formulating such an action plan often vary depending on the vehicle type and manufacturer.

Here, a case is discussed in which an automated driving vehicle as a vehicle of interest and another vehicle that is an automated driving vehicle of a different type and a different manufacturer are present in the same traffic area. In this case, in order for the vehicle of interest to formulate a safe action plan, it is preferable to grasp a future behavior of the other vehicle. However, as described above, the difference in vehicle type and manufacturer makes it difficult to accurately predict the action plan of the other vehicle. For this reason, the vehicle of interest needs to allow a certain latitude in the predicted future behavior of the other vehicle, which causes a large processing load on the computer when it formulates a safe action plan. The same applies to a case where the relationship of the vehicle of interest and the other vehicle is reversed. This tendency becomes notable in a traffic area where many traffic participants are moving in respective directions.

It is an object of the present invention to provide an automated driving vehicle and a traffic safety support system that make it possible to formulate a safe action plan with a small processing load, and to thereby contribute to development of a sustainable transport system.

(1) One aspect of the present invention is directed to an automated driving vehicle (e.g., a four-wheeled automobile 2, an automated driving vehicles 2a, 2b, 2c, 2d to be described later) including: an external information acquirer (e.g., an external information acquisition device 21 to be described later) configured to acquire external information regarding a state of surroundings of the automated driving vehicle as a vehicle of interest; an on-board communicator (e.g., an on-board communication device 23 to be described later) configured to receive a risk area notification regarding a high-risk area (e.g., high-risk areas 91a, 91b, 91c to be described later) in a target traffic area, the risk area notification being wirelessly transmitted from an information provider (e.g., a traffic management server 6 to be described later) installed outside the vehicle of interest; an action plan formulator (e.g., an action plan formulation device 24 to be described later) configured to formulate, based on the external information and the risk area notification, an action plan for the vehicle of interest such that a behavior of the vehicle of interest is prevented from exceeding a predetermined behavior allowable range; and a travel controller (e.g., a travel control device 25 to be described later) configured to operate a travel actuator based on the action plan to cause the vehicle of interest to automatically travel. In a case where the vehicle of interest is moving within the high-risk area, the action plan formulator sets the behavior allowable range to a range associated with the risk area notification.

(2) According to the above aspect, the action plan formulator preferably narrows the behavior allowable range in the case where the vehicle of interest is moving within the high-risk area, in comparison with a case where the vehicle of interest is moving outside the high-risk area.

(3) According to the above aspect, the action plan formulator preferably narrows the behavior allowable range by setting at least one of an upper limit acceleration or a lower limit acceleration with respect to an acceleration of the vehicle of interest closer to 0, the upper limit acceleration being a positive value, the lower limit acceleration being a negative value.

(4) According to the above aspect, the action plan formulator preferably narrows the behavior allowable range by lowering an upper limit speed with respect to a speed of the vehicle of interest.

(5) According to the above aspect, the action plan formulator preferably narrows the behavior allowable range by increasing a lower limit margin with respect to an inter-vehicle margin between the vehicle of interest and a preceding vehicle.

(6) According to the above aspect, the action plan formulator preferably narrows the behavior allowable range by prohibiting a lane change behavior of the vehicle of interest.

(7) According to the above aspect, the high-risk area is preferably divided into a core area (e.g., a core area 92 to be described later) and a peripheral area (e.g., peripheral areas 93a, 93b to be described later) that is defined around the core area and has a lower risk than the core area, and in a case where the vehicle of interest is moving within the peripheral area, the action plan formulator preferably narrows the behavior allowable range as the vehicle of interest approaches the core area.

(8) According to the above aspect, it is preferable that the automated driving vehicle further includes a navigator (e.g., a navigation device 22 to be described later) configured to plan a target travel route for the vehicle of interest, and the action plan formulator formulates the action plan such that the vehicle of interest moves along a road specified by the target travel route. In a case where the vehicle of interest is moving outside the high-risk area and the target travel route passes through the high-risk area, the navigator preferably replans the target travel route such that the vehicle of interest bypasses the high-risk area.

(9) One aspect of the present invention is directed to a traffic safety support system including: the automated driving vehicle (e.g., a four-wheeled automobile 2, automated driving vehicles 2a, 2b, 2c to be described later) according to (1) above; and a traffic management server (e.g., a traffic management server 6 to be described later) as the information provider. The traffic management server includes: a target traffic area recognizer (e.g., a target area recognition unit 60 to be described later) configured to recognize, as recognition targets, traffic participants in the target traffic area and traffic environments surrounding the traffic participants, and acquire recognition information regarding the recognition targets; a high-risk area identifier (e.g., a high-risk area identification unit 61 to be described later) configured to identify the high-risk area in the target traffic area based on the recognition information; a risk area notification generator (e.g., a risk area notification generation unit 62 to be described later) configured to generate a risk area notification regarding the high-risk area; and a notification transmitter (e.g., a notification transmission unit 63) configured to transmit the risk area notification to the traffic participants.

(10) According to the above aspect, the high-risk area identifier preferably identifies, in the target traffic area, a traffic area in which a traffic flow is disturbed as the high-risk area.

(11) According to the above aspect, the risk area notification preferably includes information regarding a location and a range of the high-risk area.

(12) According to the above aspect, it is preferable that the risk area notification further includes information regarding a setting value for the behavior allowable range.

(13) According to the above aspect, it is preferable that the risk area notification further includes information regarding a degree of risk in the high-risk area.

(1) In the automated driving vehicle according to the present invention, the external information acquirer acquires the external information regarding a state of the surroundings of the automated driving vehicle as the vehicle of interest, the on-board communicator receives the risk area notification wirelessly transmitted from the information provider installed outside the vehicle of interest, the action plan formulator formulates, based on the external information and the risk area notification, an action plan for the vehicle of interest such that a behavior of the vehicle of interest is prevented from exceeding a predetermined behavior allowable range, and the travel controller operates the travel actuator based on the formulated action plan to cause the vehicle of interest to automatically travel. Here, in a case where the vehicle of interest is moving within the high-risk area indicated by the risk area notification transmitted from the information provider, the action plan formulator sets the behavior allowable range to a range associated with the risk area notification.

Effects exerted by setting the behavior allowable range to the range associated with the risk area notification will be described with reference to a case in which the vehicle of interest that is the automated driving vehicle and another vehicle that is an automated driving vehicle are present in the same high-risk area at the same time. In this case, according to the present invention, a behavior of the vehicle of interest and that of the other vehicle are limited to a common behavior allowable range associated with the risk area notification during a period in which the the vehicle of interest and the other vehicle are traveling within the same high-risk area. Therefore, the vehicle of interest can accurately grasp the behavior allowable range of the other vehicle and vice versa. Thus, the vehicle of interest and the other vehicle each can efficiently formulate a safe action plan with a small processing load, thereby contributing to development of a sustainable transport system. Furthermore, according to the present invention, since the behavior allowable range is set to the range associated with the risk area notification only in the high-risk area where many traffic participants are moving in respective directions, the behaviors of the automated driving vehicles are not unnecessarily limited, whereby the convenience of each user is not impaired.

(2) In the automated driving vehicle according to the present invention, the action plan formulator narrows the behavior allowable range in the case where the vehicle of interest is moving within the high-risk area, in comparison with a case where the vehicle of interest is moving outside the high-risk area. Due to this feature, in the high-risk area where many traffic participants including the vehicle of interest and the other vehicle that are automated driving vehicles are moving in respective directions, the vehicle of interest can narrow down a future position of the other vehicle and vice versa, as described above. Accordingly, the vehicle of interest and the other vehicle each can efficiently formulate a safe action plan with a small processing load.

(3) In the automated driving vehicle according to the present invention, the action plan formulator narrows the behavior allowable range by setting at least one of the upper limit acceleration or the lower limit acceleration with respect to the acceleration of the vehicle of interest closer to 0. Due to this feature, in the high-risk area where many traffic participants including the vehicle of interest and the other vehicle that are automated driving vehicles are moving in respective directions, the vehicle of interest can narrow down a future position of the other vehicle and vice versa, as described above. Accordingly, the vehicle of interest and the other vehicle each can efficiently formulate a safe action plan with a small processing load.

(4) In the automated driving vehicle according to the present invention, the action plan formulator narrows the behavior allowable range by lowering the upper limit speed with respect to the speed of the vehicle of interest. Due to this feature, in the high-risk area where many traffic participants including the vehicle of interest and the other vehicle that are automated driving vehicles are moving in respective directions, the vehicle of interest can narrow down a future position of the other vehicle and vice versa, as described above. Accordingly, the vehicle of interest and the other vehicle each can efficiently formulate a safe action plan with a small processing load.

(5) In the automated driving vehicle according to the present invention, the action plan formulator narrows the behavior allowable range by increasing the lower limit margin with respect to the inter-vehicle margin between the vehicle of interest and a preceding vehicle. Due to this feature, in the high-risk area where many traffic participants including the vehicle of interest and the other vehicle that are automated driving vehicles are moving in respective directions, the vehicle of interest can narrow down a future position of the other vehicle and vice versa, as described above. Accordingly, the vehicle of interest and the other vehicle each can efficiently formulate a safe action plan with a small processing load.

(6) In the automated driving vehicle according to the present invention, the action plan formulator narrows the behavior allowable range by prohibiting the lane change behavior of the vehicle of interest. Due to this feature, in the high-risk area where many traffic participants including the vehicle of interest and the other vehicle that are automated driving vehicles are moving in respective directions, the vehicle of interest can narrow down a future position of the other vehicle and vice versa, as described above. Accordingly, the vehicle of interest and the other vehicle each can efficiently formulate a safe action plan with a small processing load.

(7) In the automated driving vehicle according to the present invention, in a case where the vehicle of interest is moving within the peripheral area where the risk is relatively low, the action plan formulator narrows the behavior allowable range as the vehicle of interest approach the core area. This feature makes it possible to ensure safety for many traffic participants that are moving in respective directions in the high-risk area, while preventing the behavior of the vehicle of interest from being abruptly limited.

(8) In the automated driving vehicle according to the present invention, in a case where the vehicle of interest is moving outside the high-risk area and the target travel route passes through the high-risk area, the navigator replans the target travel route such that the vehicle of interest bypasses the high-risk area. This feature makes it possible to avoid a situation in which the vehicle of interest enters the high-risk area and the behavior of the vehicle of interest is consequently limited, and thereby contributes to prevention of a further increase in the risk of accident in the high-risk area.

(9) The traffic safety support system according to the present invention includes the above-described automated driving vehicle and the traffic management server that delivers the risk area notification to the automated driving vehicle. The traffic management server includes: the target traffic area recognizer that recognizes, as recognition targets, traffic participants in the target traffic area and traffic environments surrounding the traffic participants, and acquires recognition information regarding the recognition targets; the high-risk area identifier that identifies the high-risk area in the target traffic area based on the recognition information; the risk area notification generator that generates the risk area notification regarding the high risk area; and the notification transmitter that transmits the risk area notification to the traffic participants. Thus, the traffic management server of the present invention recognizes a state of the target traffic area from a broader point of view, and accordingly, can efficiently identify the high-risk area in the target traffic area.

(10) In the traffic safety support system according to the present invention, the high-risk-area identifier identifies, in the target traffic area, a traffic area in which a traffic flow is disturbed as the high-risk area. This feature makes it possible to efficiently identify the high-risk area in the target traffic area.

(11) In the traffic safety support system according to the present invention, the notification transmitter delivers a risk area notification including information regarding the location and range of the high-risk area to the traffic participants. Thus, upon reception of the risk area notification, the automated driving vehicle can grasp the location and range of the high-risk area.

(12) In the traffic safety support system according to the present invention, the notification transmitter delivers the risk area notification including information regarding the setting value for the behavior allowable range to the traffic participants. That is, according to the present invention, the traffic safety support system, which manages the traffic participants in the target traffic area from a broader point of view as described above, can set the setting value for a common behavior allowable range for each high-risk area, thereby making it possible to set the behavior allowable range to a range suitable for each high-risk area.

(13) In the traffic safety support system according to the present invention, the notification transmitter delivers the risk area notification including information regarding a degree of risk in the high-risk area to the traffic participants. Due to this feature, upon reception of the risk area notification, the automated driving vehicle can grasp the degree of risk in addition to the location and range of the high-risk area, and can set the behavior allowable range to an appropriate range in accordance with the degree of risk.

BRIEF DESCRIPTION OF THE DRAWINGS

FIG. 6 is a diagram illustrating an example of a target traffic area;

FIG. 7 is a diagram illustrating an example of a target traffic area supported by a traffic safety support system according to a second embodiment of the present invention;

DETAILED DESCRIPTION OF THE INVENTION

First Embodiment

An automated driving vehicle according to a first embodiment of the present invention and a traffic safety support system including the automated driving vehicle will be described with reference to the drawings.

Figure 1:
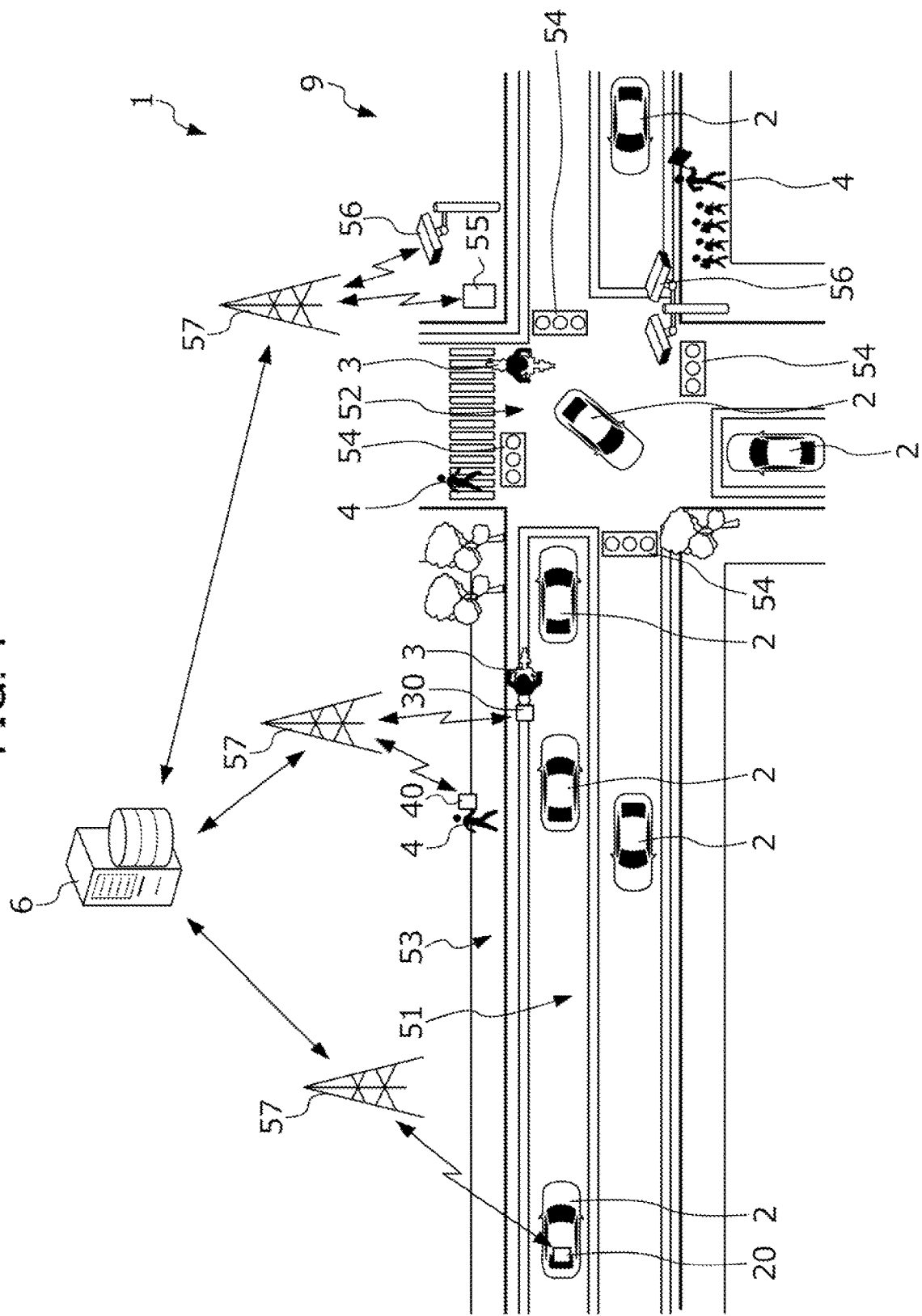
FIG. 1 is a diagram illustrating a configuration of a traffic safety support system according to a first embodiment of the present invention and a part of a target traffic area supported by the traffic safety support system.

FIG. 1 is a diagram schematically illustrating a configuration of a traffic safety support system 1 according to the present embodiment and a part of a target traffic area 9 where support targets supported by the traffic safety support system 1 are present.

The traffic safety support system 1 recognizes, as individual traffic participants, pedestrians 4 that are persons who move in the target traffic area 9 and four-wheeled automobiles 2, motorcycles 3, etc. that are mobile bodies which move in the target traffic area 9. Furthermore, the traffic safety support system 1 generates a notification through the recognition and delivers the notification to the traffic participants, thereby assisting the traffic participants in safely and smoothly moving in the target traffic area 9.

FIG. 1 illustrates a case where an area located in an urban district, covering an intersection 52 and the vicinity thereof, and including a road 51, the intersection 52, sidewalks 53, and traffic lights 54 as traffic infrastructure is set as the target traffic area 9. In the case illustrated in FIG. 1, a total of seven four-wheeled automobiles 2 and a total of two motorcycles 3 move on the road 51 and at the intersection 52, and a total of three groups of pedestrians 4 move on the sidewalks 53 and at the intersection 52. Further, in the case illustrated in FIG. 1, a total of three infrastructure cameras 56 are installed.

The traffic safety support system 1 includes: on-board equipment 20 that moves together with the respective individual four-wheeled automobile 2; on-board equipment 30 that moves together with the respective individual motorcycle 3; portable information processing terminals 40 held or worn by the respective pedestrians 4; the plurality of infrastructure cameras 56 installed in the target traffic area 9; a traffic light control device 55 that controls the traffic lights 54; and a traffic management server 6 wirelessly communicatively connected to the plurality of terminals present in the target traffic area 9 (hereinafter, also referred to collectively as "area terminals"), including the on-board equipment 20 and 30, the portable information processing terminals 40, the infrastructure cameras 56, the traffic light control device 55, etc.

The traffic management server 6 includes one or more computers communicatively connected to the above-described plurality of area terminals via base stations 57. More specifically, the traffic management server 6 includes a server connected to the plurality of area terminals via the base stations 57, a network core, and the Internet. Alternatively or additionally, the traffic management server 6 includes, for example, an edge server connected to the plurality of area terminals via the base stations 57 and a multi-access edge computing (MEC) core.

Figure 2:
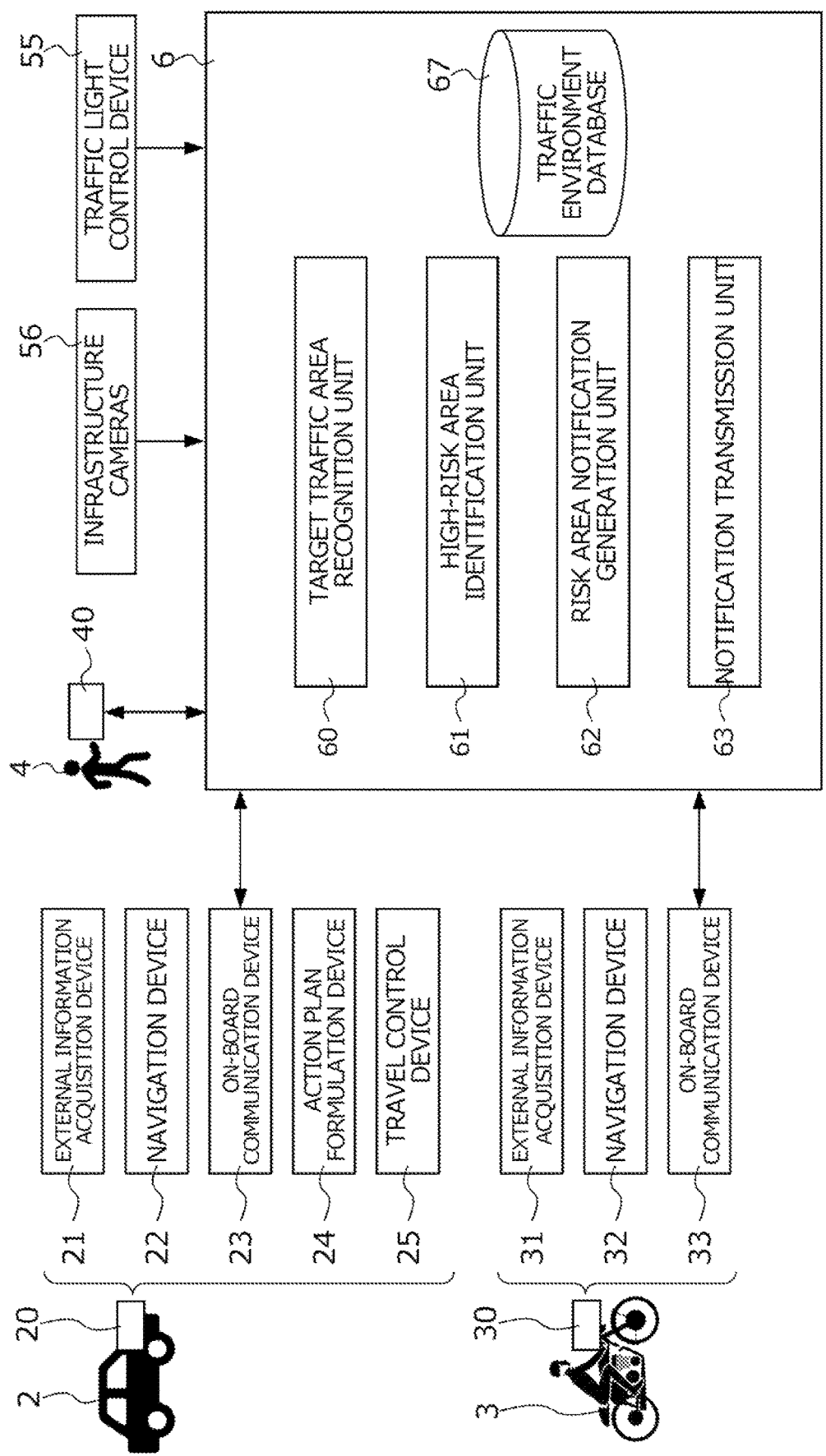
FIG. 2 is a block diagram illustrating a configuration of a traffic management server and those of a plurality of area terminals communicatively connected to the traffic management server.

FIG. 2 is a block diagram illustrating configurations of the traffic management server 6 and the plurality of area terminals communicatively connected to the traffic management server 6. It should be noted that FIG. 2 illustrates, from among the plurality of four-wheeled automobiles 2 that are wirelessly communicatively connected to the traffic management server 6, only an automated driving vehicle that is capable of automatically traveling without depending on the driver's driving operation.

The on-board equipment 20 mounted on the four-wheeled automobile 2 that is the automated driving vehicle includes, for example, an external information acquisition device 21, a navigation device 22, an on-board communication device 23, an action plan formulation device 24, and a travel control device 25.

The external information acquisition device 21 includes an on-board camera unit that captures an image of surroundings of the four-wheeled automobile 2 as the vehicle of interest, on-board external sensors, such as a radar unit and a LIDAR unit that detect an object outside the vehicle of interest using electromagnetic waves, and an external recognition device that acquires external information regarding a state of the surroundings of the vehicle of interest based on detection results from the on-board camera unit and the on-board external sensors.

The on-board communication device 23 has a transmission function of transmitting, to the traffic management server 6, the external information acquired by the external information acquisition device 21, the position information (including not only information regarding the current position of the vehicle of interest acquired by the navigation device 22, but also information regarding a moving speed and an acceleration of the vehicle of interest acquired by an on-vehicle sensor (not shown), etc.), and the like. The on-board communication device 23 further has a reception function of receiving notifications (e.g., a risk area notification to be described later) wirelessly transmitted from the traffic management server 6.

The navigation device 22 has a current position identification function of identifying the current position of the vehicle of interest based on a signal received from, for example, a GNSS satellite, a target travel route planning function of planning a target travel route from the current position of the vehicle of interest to a predetermined destination based on map information stored in a storage device (not shown), and a notification function of notifying information regarding the planned target travel route and information generated based on a notification transmitted from the traffic management server 6 to the driver in a form perceptible to the driver, such as a voice and/or an image.

As will be described in detail later, the risk area notification that the traffic management server 6 delivers to the traffic participants in the target traffic area 9 includes information regarding a high-risk area where a risk of accident is relatively high in the target traffic area (more specifically, information regarding a location, a range, and the like of the high-risk area). Therefore, upon receiving the risk area notification, the navigation device 22 performs the above-described notification function so as to notify the information regarding the location and range of the high-risk area associated with the risk area notification to the driver of the vehicle of interest, thereby proposing a route for bypassing the high-risk area to the driver and/or prompting the driver to pay attention to the surroundings. Furthermore, in a case where the vehicle of interest is moving outside the high-risk area indicated by the risk area notification and the target travel route passes through the high-risk area, the navigation device 22 can replan the target travel route such that the vehicle of interest will bypass the high-risk area.

The action plan formulation device 24 plans a target travel path for the vehicle of interest to travel from the current time until predetermined future time, based on the external information acquired by the external information acquisition device 21, the information regarding the target travel route planned by the navigation device 22, the map information, the position information regarding the vehicle of interest, and the risk area notification received by the on-board communication device 23. Furthermore, the action plan formulation device 24 formulates an action plan for realizing the target travel path.

More specifically, the action plan formulation device 24 plans the target travel path and formulates the action plan, such that the vehicle of interest will move along a road specified by the target travel route, comply with laws stipulated for the road on which the vehicle of interest travels, ensure safety for the vehicle of interest and the traffic participants present near the vehicle of interest, and prevent behaviors of the vehicle of interest from exceeding a predetermined behavior allowable range.

Here, the behavior allowable range refers to a range in which behaviors of the vehicle of interest along the traveling direction (more specifically, an acceleration behavior, a deceleration behavior, a preceding vehicle following behavior, and the like) are allowed and behaviors along the vehicle width direction (more specifically, a lane change behavior) are allowed. That is, the action plan formulation device 24 formulates the action plan such that the behaviors of the vehicle of interest along the traveling direction and the vehicle width direction are prevented from exceeding the behavior allowable range. In other words, the action plan formulation device 24 formulates the action plan while limiting the behaviors of the vehicle of interest along the traveling direction and the vehicle width direction within the behavior allowable range.

In the present embodiment, a case will be described in which the action plan formulation device 24 sets the behavior allowable range with respect to all of an acceleration of the vehicle of interest, a speed of the vehicle of interest, an inter-vehicle margin between the vehicle of interest and a preceding vehicle, and an amount of movement of the vehicle of interest in the vehicle width direction. However, the present invention is not limited to this case. The action plan formulation device 24 may set the behavior allowable range with respect to one of the acceleration, speed, inter-vehicle margin, and amount of movement in the vehicle width direction, or with respect to a combination of two or more of the foregoing. In the following description, a case will be described in which a time period until a possible collision (hereinafter referred to as the collision margin time) calculated by dividing an inter-vehicle distance between the vehicle of interest and a preceding vehicle by a relative speed is defined as the inter-vehicle margin, but the present invention is not limited thereto.

The action plan formulation device 24 sets the behavior allowable range by setting values of a plurality of behavior restriction parameters that include, for example, an upper limit acceleration (a positive value) and a lower limit acceleration (a negative value) with respect to the acceleration of the vehicle of interest, an upper limit speed with respect to the speed of the vehicle of interest, a lower limit margin time with respect to the collision margin time between the vehicle of interest and the preceding vehicle, and a lane change prohibition flag.

That is, the action plan formulation device 24 limits the acceleration of the vehicle of interest within the range lower than the upper limit acceleration and equal to or higher than the lower limit acceleration, limits the speed of the vehicle of interest to a range below the upper limit speed, and limits the collision margin time between the vehicle of interest and the preceding vehicle to a range equal to or greater than the lower limit margin time. The action plan formulation device 24 allows the lane change behavior when the value of the lane change prohibition flag is set to "0", and prohibits the lane change behavior when the value of the lane change prohibition flag is set to "1". Thus, the action plan formulation device 24 can narrow the behavior allowable range by making the value of at least one of the upper limit acceleration or the lower limit acceleration closer to 0, by reducing the value of the upper limit speed, or by increasing the value of the lower limit margin time. Furthermore, the action plan formulation device 24 can narrow the behavior allowable range by changing the value of the lane change prohibition flag from "0" to "1" to prohibit the lane change behavior.

A specific procedure for a behavior allowable range setting process for setting the behavior allowable range will be described later in detail with reference to FIGS. 3 to 6.

The travel control device 25 operates travel actuators (not show; e.g., a drive motor, a braking actuator, a steering actuator, and the like) for making the vehicle of interest to travel, based on the action plan formulated by the action plan formulation device 24, thereby causing the vehicle of interest to automatically travel.

The on-board equipment 30 mounted on the motorcycle 3 includes, for example, an external information acquisition device 31, a navigation device 32, and an on-board communication device 33.

An external information acquisition device 31 includes an on-board camera unit that captures an image of surroundings of a motorcycle 3 as the vehicle of interest, on-board external sensors, such as a radar unit and a LIDAR unit that detect an object outside the vehicle of interest using electromagnetic waves, and an external recognition device that acquires external information regarding a state of the surroundings of the vehicle of interest based on detection results from the on-board camera unit and the on-board external sensors.

An on-board communication device 33 has a transmission function of transmitting, to the traffic management server 6, the external information acquired by the external information acquisition device 31, position information (including not only information regarding the current position of the vehicle of interest acquired by a navigation device 32, but also information regarding a moving speed and an acceleration of the vehicle of interest acquired by an on-vehicle sensor (not shown), etc.), and the like. The on-board communication device 33 further has a reception function of receiving notifications wirelessly transmitted from the traffic management server 6.

The navigation device 32 has a current position identification function of identifying the current position of the vehicle of interest based on a signal received from, for example, a GNSS satellite, a target travel route planning function of planning a target travel route from the current position of the vehicle of interest to a predetermined destination based on map information stored in a storage device (not shown), and a notification function of notifying information regarding the planned target travel route and information generated based on a notification transmitted from the traffic management server 6 to the driver in a form perceptible to the driver, such as a voice and/or an image.

As described above, the risk area notification delivered to the traffic participants in the target traffic area 9 includes information regarding the location and range of the high-risk area where a risk of accident is relatively high in the target traffic area. Therefore, upon receiving the risk area notification, the navigation device 32 performs the above-described notification function so as to notify the information regarding the location and range of the high-risk area associated with the risk area notification to the driver of the vehicle of interest, thereby proposing a route for bypassing the high-risk area to the driver and/or prompting the driver to pay attention to the surroundings. Furthermore, in a case where the vehicle of interest is moving outside the high-risk area and the target travel route passes through the high-risk area, the navigation device 32 can replan the target travel route such that the vehicle of interest will bypass the high-risk area.

Among the above-described components included in the on-board equipment 30, for example, a part or all of the functions of the navigation device 32 and the on-board communication device 33 may be implemented by a portable information processing terminal such as a smartphone or a wearable terminal held or worn by the driver of the motorcycle 3.

The portable information processing terminal 40 held or worn by the pedestrian 4 in the target traffic area is, for example, a wearable terminal worn by the pedestrian 4, a smartphone held by the pedestrian 4, or the like.

The portable information processing terminal 40 has a transmission function of transmitting position information regarding the pedestrian 4 (including not only information regarding the current position, but also information regarding a moving speed, etc.) to the traffic management server 6, a reception function of receiving notifications transmitted from the traffic management server 6, and a notification function of notifying information generated based on the received notification to the pedestrian 4 in a form perceptible to the pedestrian 4, such as voice and/or an image.

As described above, the risk area notification delivered to the traffic participants in the target traffic area 9 includes information regarding the high-risk area where a risk of accident is relatively high in the target traffic area. Therefore, upon receiving the risk area notification, the portable information processing terminal 40 performs the above-described notification function so as to notify the information regarding the location and range of the high-risk area associated with the risk area notification to the pedestrian 4, thereby proposing a route for bypassing the high-risk area to the pedestrian 4 and/or prompting the pedestrian 4 to pay attention to the surroundings.

The infrastructure cameras 56 capture images of the traffic infrastructure in the target traffic area including the roads, the intersection, and the sidewalks as well as the mobile bodies and the pedestrians that move on the roads, the intersection, the sidewalks, and the like, and transmit the obtained image information to the traffic management server 6.

The traffic light control device 55 controls the traffic lights and transmits, to the traffic management server 6, traffic light status information regarding current lighting color of the traffic lights in the target traffic area, a timing at which the lighting color is switched, and the like.

The traffic management server 6 is a computer that generates, based on the information acquired from the above-described plurality of area terminals present in the target traffic area, notifications for supporting safe and smooth traffic of each traffic participant in the target traffic area, and transmits the notifications to each traffic participant.

The traffic management server 6 includes: a target traffic area recognition unit 60 for recognizing traffic participants in the target traffic area and traffic environments surrounding the traffic participants; a high-risk area identification unit 61 for identifying the high-risk area in the target traffic area based on recognition results from the target traffic area recognition unit 60; a risk area notification generation unit 62 for generating the risk area notification regarding the high-risk area identified by the high-risk area identification unit 61; a notification transmission unit 63 for wirelessly transmitting the risk area notification generated by the risk area notification generation unit 62 to the traffic participants; and a traffic environment database 67 storing information regarding the traffic environment in the target traffic area.

The traffic environment database 67 stores pre-registered map information (e.g., the width of a road, the number of lanes, the speed limit, the width of a sidewalk, the presence or absence of a guardrail between the road and the sidewalk, the location of a crosswalk, etc.) of the target traffic area, information regarding a standard traffic volume for each of local traffic areas defined by subdividing the target traffic area, and the like. Here, the standard traffic volume refers to a standard traffic volume in a local traffic area of interest, and is determined by performing predetermined statistical processing on past traffic volume data.

Based on the information transmitted from the above-described area terminals (the on-board equipment 20 and 30, the portable information processing terminals 40, the infrastructure cameras 56, and the traffic light control device 55) in the target traffic area and information read from the traffic environment database 67, the target traffic area recognition unit 60 recognizes recognition targets including the traffic participants each of which is a person or a mobile body in the target traffic area, and the traffic environments surrounding the traffic participants, and acquires recognition information regarding the recognition targets.

Here, the information transmitted to the target traffic area recognition unit 60 from the on-board communication device 23 included in the on-board equipment 20 and the information transmitted to the target traffic area recognition unit 60 from the on-board communication device 33 included in the on-board equipment 30 include, for example, information regarding the traffic participants present near the respective vehicles and the traffic environments that have been acquired by the external information acquisition devices 21 and 31, and the position information regarding the respective vehicles. The information transmitted from the portable information processing terminal 40 to the target traffic area recognition unit 60 includes the position information regarding the pedestrian. Image information transmitted from the infrastructure cameras 56 to the target traffic area recognition unit 60 includes information regarding the traffic participants and traffic environment surrounding the traffic participants, such as external appearance of the traffic infrastructure such as the roads, the intersection, and the sidewalks, and external appearance of traffic participants moving in the target traffic area. The traffic light status information transmitted from the traffic light control device 55 to the target traffic area recognition unit 60 includes information regarding the traffic environment surrounding the traffic participants, such as current lighting color of the traffic lights and a timing for switching the lighting color. The information that the target traffic area recognition unit 60 reads from the traffic environment database 67 includes the map information of the target traffic area.

Accordingly, based on the information transmitted from these area terminals, the target traffic area recognition unit 60 can acquire recognition information (hereinafter, referred to also as the "traffic participant recognition information") of each traffic participant in the target traffic area, such as the position of each traffic participant in the target traffic area, a movement vector (i.e., a vector extending in the moving direction and having a length proportional to a moving speed) of each traffic participant, a moving acceleration, the type of a mobile body, a speed of the mobile body, the registration number of the mobile body, the number of persons forming a pedestrian group, and age groups, etc. of the pedestrians. The target traffic area recognition unit 60 can further acquire, based on the information transmitted from the foregoing area terminals, recognition information regarding the traffic environments surrounding the traffic participants (hereinafter, referred to also as the "traffic environment recognition information") in the target traffic area, such as the width of a road, the number of lanes, the speed limit, the width of a sidewalk, the presence or absence of a guardrail between the road and the sidewalk, lighting color of the traffic light, and a timing for switching the lighting color.

The target traffic area recognition unit 60 transmits the traffic participant recognition information and the traffic environment recognition information acquired in the above-described way to the high-risk area identification unit 61.

Based on the recognition information acquired by the target traffic area recognition unit 60, the high-risk area identification unit 61 identifies, in the target traffic area, a local traffic area where a risk of accident has increased as a high-risk area. More specifically, the high-risk area identification unit 61 creates a virtual space reflecting states of the traffic participants moving in the actual target traffic area by applying the so-called digital twin technology to the traffic participant recognition information and the traffic environment recognition information described above, and performs a simulation on the virtual space to thereby identify the high-risk area in the target traffic area.

The high-risk area identification unit 61 identifies, in the target traffic area, a local traffic area in which a traffic flow is disturbed as the high-risk area. More specifically, the high-risk area identification unit 61 calculates a traffic volume of traffic participants for each local traffic area in the virtual space, and compares the calculated traffic volume with the standard traffic volume read from the traffic environment database 67. In a case where a traffic volume calculated for a local traffic area in the virtual space has continued deviating from the standard traffic volume by at least a predetermined value for a predetermined time, the high-risk area identification unit 61 determines that the traffic flow in the local traffic area is disturbed, and identifies the local traffic area as the high-risk area.

The risk area notification generation unit 62 generates a risk area notification regarding the high-risk area identified by the high-risk area identification unit 61. More specifically, the risk area notification generation unit 62 generates a risk area notification including at least information regarding the location and range of the high-risk area.

The risk area notification generation unit 62 may generate a risk area notification including information regarding setting values for a behavior allowable range (i.e., setting values for a plurality of behavior restriction parameters) in addition to the information regarding the location and range of the high-risk area. In this case, the risk area notification generation unit 62 may perform a simulation on the virtual space constructed by the high-risk area identification unit 61 to thereby determine setting values for a behavior allowable range common to automated driving vehicles present in the high-risk area such that safety will be ensured for all the traffic participants in the local traffic area of interest, and may generate the risk area notification including information regarding the setting values for the behavior allowable range.

The risk area notification generation unit 62 may generate a risk area notification including information regarding a degree of risk in the high-risk area in addition to information regarding the location and range of the high-risk area. In this case, the risk area notification generation unit 62 may perform a simulation on the virtual space constructed by the high-risk area identification unit 61 to thereby calculate the degree of risk in the high-risk area of interest, and may generate the risk area notification including the degree of risk.

The notification transmission unit 63 delivers the risk area notification generated by the risk area notification generation unit 62 to the traffic participants in the target traffic area. In the following, a case will be described in which the risk area notification is delivered to all the traffic participants in the target traffic area, but the present invention is not limited to such a case. The notification transmission unit 63 may transmit the risk area notification to only traffic participants present in the high-risk area in the target traffic area, or may transmit the risk area notification to only traffic participants present in the high-risk area and those present in the vicinity of the high-risk area.

Next, a process will be described in which the action plan formulation device 24 sets a behavior allowable range based on the risk area notification delivered in the the above-described way from the traffic management server 6.

Figure 3:
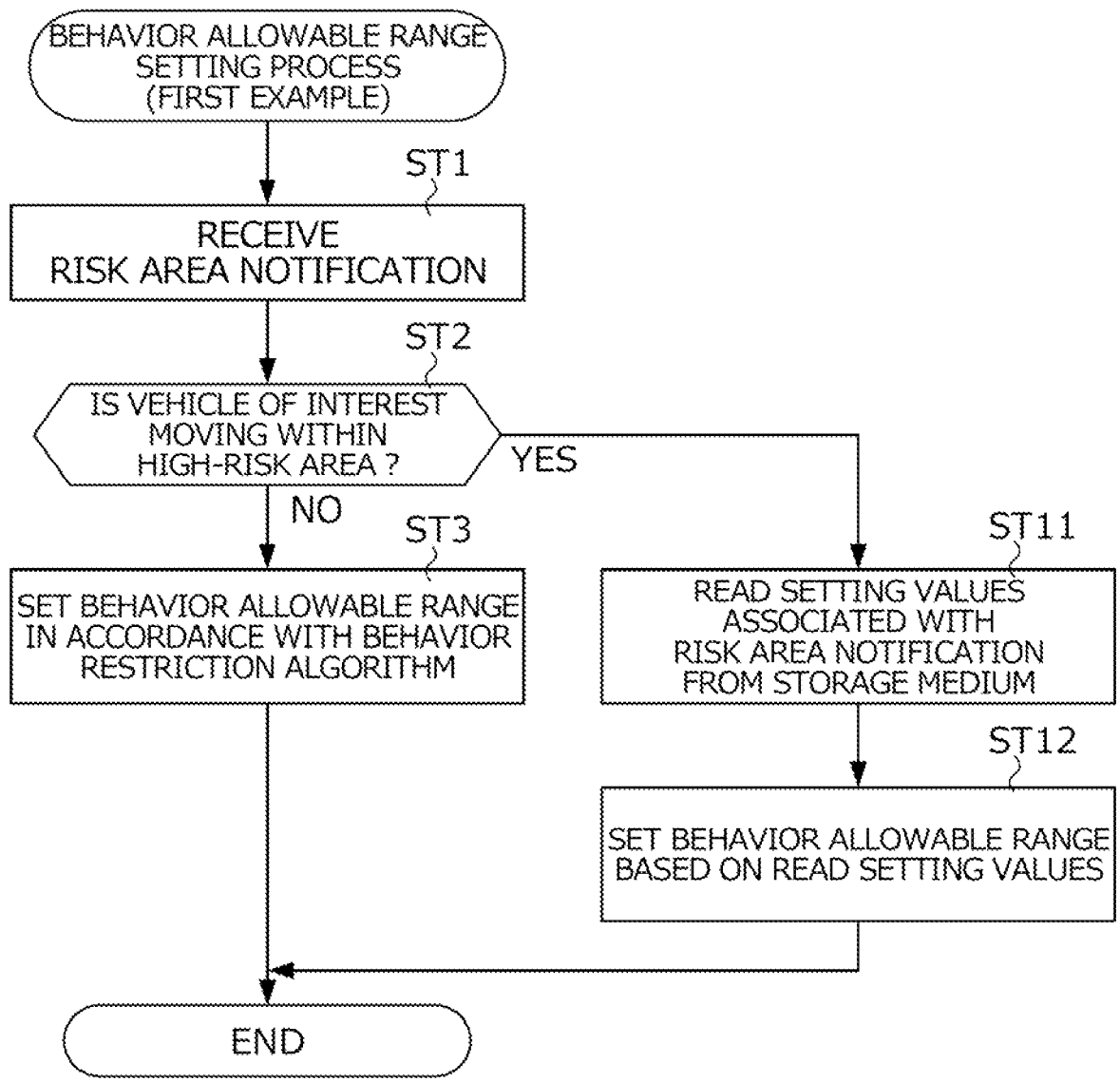
FIG. 3 is a flowchart illustrating a first example of a behavior allowable range setting process.

FIG. 3 is a flowchart illustrating a first example of the behavior allowable range setting process performed by the action plan formulation device 24. The behavior allowable range setting process of this example is repeatedly performed by the action plan formulation device 24 in a predetermined control cycle during a period in which the vehicle of interest is moving. As will be described below, in the first example, the action plan formulation device 24 sets a behavior allowable range using the information regarding the location and range of a high-risk area, from among various information included in the risk area notification delivered from the traffic management server 6.

First, in Step ST1, the action plan formulation device 24 receives the risk area notification delivered from the traffic management server 6, and proceeds to Step ST2.

In Step ST2, the action plan formulation device 24 compares a current position of the vehicle of interest with the location and range of the high-risk area indicated by the risk area notification received in Step ST1, and determines whether or not the vehicle of interest is currently moving within the high-risk area.

When the determination result in Step ST2 is NO, that is, when the vehicle of interest is moving outside the high-risk area, the action plan formulation device 24 proceeds to Step ST3. In Step ST3, the action plan formulation device 24 sets the behavior allowable range in accordance with a predetermined behavior restriction algorithm, and ends the process illustrated in FIG. 3. Specifically, the action plan formulation device 24 sets the behavior allowable range by setting values of the plurality of behavior restriction parameters described above (i.e., the upper limit acceleration, the lower limit acceleration, the upper limit speed, the lower limit margin time, and the lane change prohibition flag) in accordance with the behavior restriction algorithm. More specifically, the action plan formulation device 24 sets the behavior allowable range in accordance with the behavior restriction algorithm that uses, for example, external information and laws applied to a road on which the vehicle is traveling. Generally, the behavior restriction algorithms vary depending on the vehicle types, manufacturers, and the like. Therefore, the behavior allowable ranges set for vehicles during a period in which the vehicles are moving outside the high-risk area generally vary depending on the vehicle types and manufacturers.

On the other hand, when the determination result in Step ST2 is YES, that is, when the vehicle of interest is moving within the high-risk area, the action plan formulation device 24 proceeds to Step ST11. In Step ST11, the action plan formulation device 24 reads, from a storage medium (not shown), setting values of a plurality of behavior restriction parameters associated with the risk area notification, and proceeds to Step ST12.

In Step ST12, the action plan formulation device 24 sets the behavior allowable range to a range associated with the risk area notification by setting values of the plurality of behavior restriction parameters based on the setting values read in Step ST11, and ends the process illustrated in FIG. 3.

The setting values stored in the storage medium are common and do not depend on the vehicle types or manufacturers. Therefore, according to the behavior allowable range setting process illustrated in FIG. 3, a common behavior allowable range is set for the vehicles moving within the high-risk area regardless of the vehicle types and manufacturers.

The setting values stored in the storage medium are preset such that a behavior allowable range set based thereon will be narrower than a behavior allowable range set based on the behavior restriction algorithm in many situations. Thus, according to the behavior allowable range setting process illustrated in FIG. 3, the behavior allowable range is set to be narrower when the vehicle of interest is moving within the high-risk area than when the vehicle of interest is moving outside the high-risk area.

Figure 4:
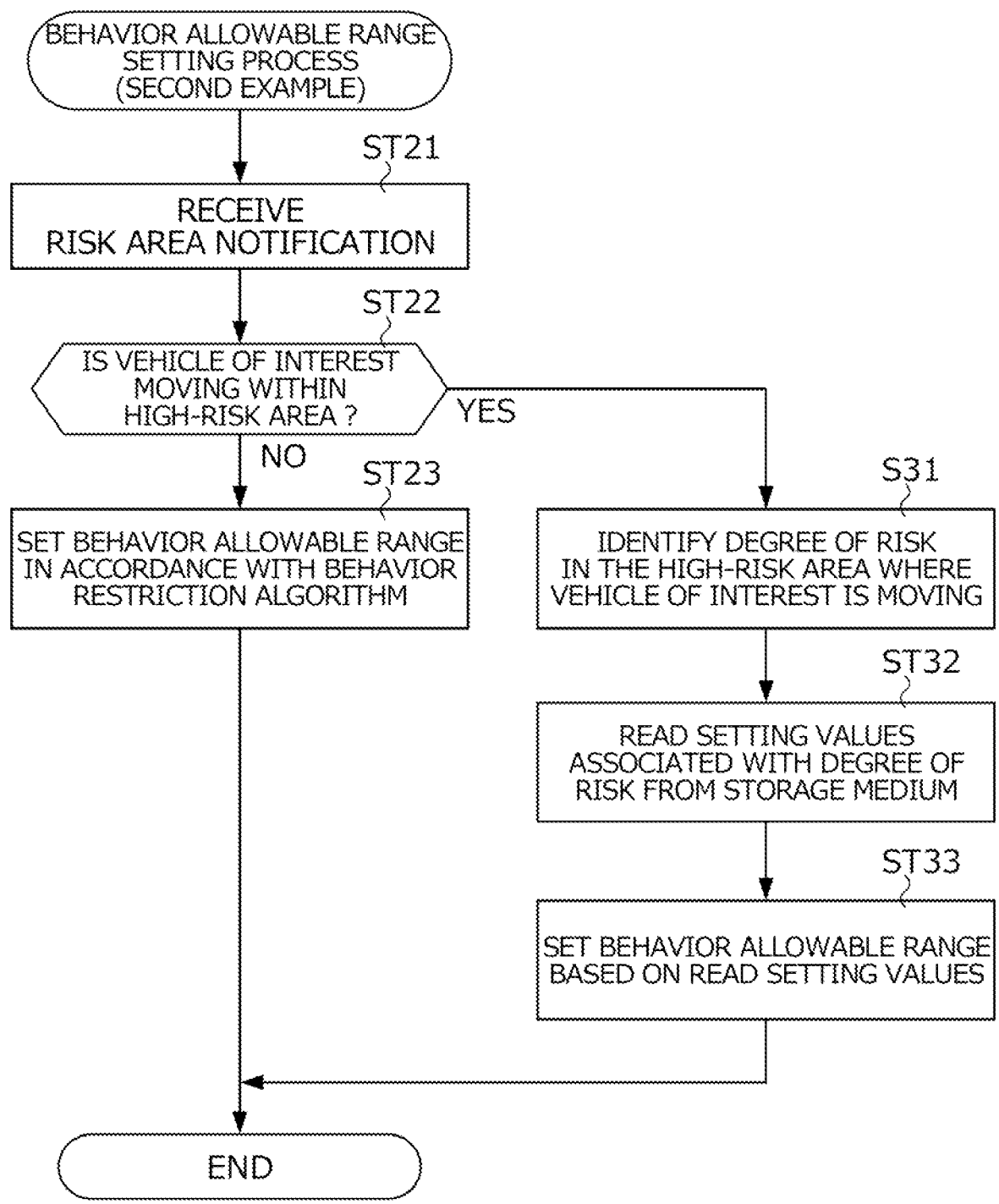
FIG. 4 is a flowchart illustrating a second example of the behavior allowable range setting process.

FIG. 4 is a flowchart illustrating a second example of the behavior allowable range setting process performed by the action plan formulation device 24. The behavior allowable range setting process of this example is repeatedly performed by the action plan formulation device 24 in a predetermined control cycle during a period in which the vehicle of interest is moving. As will be described below, in the second example, the action plan formulation device 24 sets a behavior allowable range using information regarding the location and range of a high-risk area and information regarding a degree of risk in the high-risk area, from among various information included in the risk area notification delivered from the traffic management server 6. In the flowchart illustrated in FIG. 4, the processing in Steps ST21 to ST23 is the same as that in Steps ST1 to ST3 of the flowchart in FIG. 3, and a detailed description of Steps ST21 to ST23 will be omitted.

When the determination result in Step ST22 is YES, that is, when the vehicle of interest is moving within the high-risk area, the action plan formulation device 24 proceeds to Step ST31 in order to set the behavior allowable range to a range associated with the risk area notification.

In Step ST31, the action plan formulation device 24 identifies a degree of risk in the high-risk area where the vehicle of interest is currently moving, based on the risk area notification received in Step ST21, and proceeds to Step ST32.

In Step ST32, the action plan formulation device 24 reads, from the storage medium (not shown), setting values of a plurality of behavior restriction parameters associated with the degree of risk identified in Step ST31, and proceeds to Step ST33.

In Step ST33, the action plan formulation device 24 sets the behavior allowable range to a range associated with the risk area notification by setting values of the plurality of behavior restriction parameters based on the setting values read in Step ST32, and ends the process illustrated in FIG. 4.

Here, the storage medium stores a plurality of sets of setting values of the plurality of behavior restriction parameters in association with degrees of risk. The setting values of the plurality of behavior restriction parameters stored in the storage medium are preset such that the behavior allowable range set based thereon will become narrower as the degree of risk increases. Therefore, according to the behavior allowable range setting process illustrated in FIG. 4, the behavior allowable range is set in such a manner as to become narrower as the degree of risk increases in the high-risk area where the vehicle of interest is moving.

The setting values stored in the storage medium are common and do not depend on the vehicle types or manufacturers. Therefore, according to the behavior allowable range setting process illustrated in FIG. 4, a common behavior allowable range is set for the vehicles moving within the high-risk area regardless of the vehicle types or manufacturers, similarly to the process illustrated in FIG. 3.

The setting values stored in the storage medium are preset such that a behavior allowable range set based thereon will be narrower than a behavior allowable range set based on the behavior restriction algorithm in many situations. Thus, according to the behavior allowable range setting process illustrated in FIG. 4, the behavior allowable range is set to be narrower when the vehicle of interest is moving within the high-risk area than when the vehicle of interest is moving outside the high-risk area, similarly to the process illustrated in FIG. 3.

Figure 5:
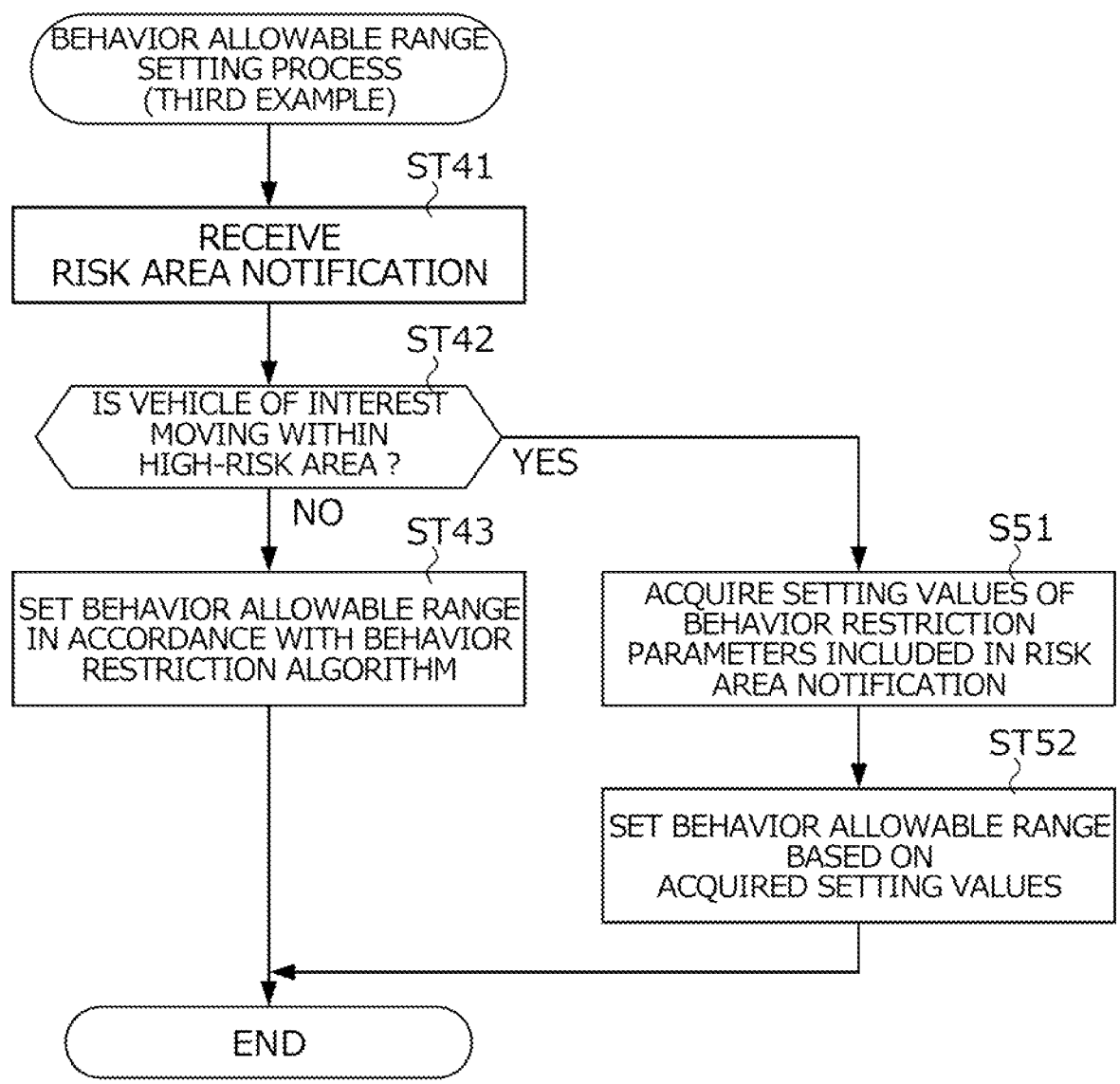
FIG. 5 is a flowchart illustrating a third example of the behavior allowable range setting process.

FIG. 5 is a flowchart illustrating a third example of the behavior allowable range setting process performed by the action plan formulation device 24. The behavior allowable range setting process of this example is repeatedly performed by the action plan formulation device 24 in a predetermined control cycle during a period in which the vehicle of interest is moving. As will be described below, in the third example, the action plan formulation device 24 sets a behavior allowable range using information regarding the location and range of a high-risk area and information regarding setting values for the behavior allowance range, from among various information included in the risk area notification delivered from the traffic management server 6. In the flowchart illustrated in FIG. 5, the processing in Steps ST41 to ST43 is the same as that in Steps ST1 to ST3 of the flowchart in FIG. 3, and a detailed description of Steps ST41 to ST43 will be omitted.

When the determination result in Step ST42 is YES, that is, when the vehicle of interest is moving within the high-risk area, the action plan formulation device 24 proceeds to Step ST51 in order to set the behavior allowable range to a range associated with the risk area notification.

In Step ST51, the action plan formulation device 24 acquires setting values of a plurality of behavior restriction parameters included in the risk area notification received in Step ST41, and proceeds to Step ST52.

In Step ST52, the action plan formulation device 24 sets the behavior allowable range to a range associated with the risk area notification by setting values of the plurality of behavior restriction parameters based on the setting values acquired in Step ST51, and ends the process illustrated in FIG. 5.

Here, the traffic management server 6 delivers a common risk area notification to the traffic participants in the target traffic area regardless of the vehicle types and manufacturers. Therefore, according to the behavior allowable range setting process illustrated in FIG. 5, a common behavior allowable range is set for the vehicles moving within the high-risk area regardless of the vehicle types and manufacturers.

The risk area notification generation unit 62 of the traffic management server 6 sets the setting values of the plurality of behavior restriction parameters such that a behavior allowable range set based on the plurality of behavior restriction parameters will be narrower than a behavior allowable range set based on the behavior restriction algorithm in many situations. Therefore, according to the behavior allowable range setting process illustrated in FIG. 5, the behavior allowable range is set to be narrower when the vehicle of interest is moving within the high-risk area than when the vehicle of interest is moving outside the high-risk area.

Next, effects exerted by the above-described behavior allowable range setting process will be described with reference to a target traffic area 9a illustrated as an example in FIG. 6.

FIG. 6 is a diagram illustrating an example of the target traffic area 9a. In the example illustrated in FIG. 6, a case will be described in which a traffic management server 6 identifies a first local traffic area 91a and a second local traffic area 91b in the target traffic area 9a as high-risk areas.

For the sake of simplification of description, FIG. 6 illustrates only the automated driving vehicles 2a, 2b, 2c, and 2d to which the present invention is applied.

The four types of automated driving vehicles 2a, 2b, 2c, and 2d illustrated in FIG. 6 have different behavior restriction algorithms. Therefore, different behavior allowable ranges are set for the automated driving vehicles 2a, 2b, 2c, and 2d that are moving outside the high-risk areas. More specifically, in a case where the automated driving vehicle 2a is moving outside the high-risk areas, the action plan formulation device of the automated driving vehicle 2a sets the upper limit acceleration to 0.1 G, the lower limit acceleration to −0.1 G, the upper limit speed to 50 km/h, and the lower limit margin time to 4 seconds, and permits lane change. In a case where the automated driving vehicle 2b is moving outside the high-risk areas, the action plan formulation device of the automated driving vehicle 2b sets the upper limit acceleration to 0.1 G, the lower limit acceleration to −0.1 G, the upper limit speed to 70 km/h, and the lower limit margin time to 4 seconds, and permits lane change. In a case where the automated driving vehicle 2c is moving outside the high-risk areas, the action plan formulation device of the automated driving vehicle 2c sets the upper limit acceleration to 0.2 G, the lower limit acceleration to −0.2 G, the upper limit speed to 50 km/h, and the lower limit margin time to 3 seconds, and permits lane change. In a case where the automated driving vehicle 2d is moving outside the high-risk areas, the action plan formulation device of the automated driving vehicle 2d sets the upper limit acceleration to 0.3 G, the lower limit acceleration to −0.3 G, the upper limit speed to 80 km/h, and the lower limit margin time to 3 seconds, and permits lane change.

In the example illustrated in FIG. 6, the traffic management server 6 responsible for the target traffic area 9a delivers, to each of the traffic participants in the target traffic area 9a, a risk area notification including information regarding the locations and ranges of the first local traffic area 91a and the second local traffic area 91b identified as high-risk areas. Consequently, each traffic participant in the target traffic area 9a can recognize the location and range of the high-risk area 91a and those of the high-risk area 91b. Therefore, traffic participants present outside the high-risk areas 91a and 91b can move while bypassing the high-risk areas 91a and 91b. As described above, in a case where a vehicle is moving outside a high-risk area indicated by a risk area notification and a target travel route passes through the high-risk area, the navigation device 22 of the vehicle replans the target travel route so that the vehicle bypasses the high-risk area. Therefore, the automated driving vehicle equipped with the navigation device 22 can avoid the high-risk areas 91a and 91b by moving along the target travel route replanned by the navigation device 22.

Among the automated driving vehicles 2a, 2b, 2c, and 2d in the target traffic area 9a, the vehicles moving within the high-risk areas 91a and 91b each set its behavior allowable range to a range associated with the risk area notification delivered from the traffic management server 6 by performing the above-described behavior allowable range setting process (see FIGS. 3 to 5). In the example illustrated in FIG. 6, a case will be described in which the upper limit acceleration is set to +0.1 G, the lower limit acceleration is set to −0.1 G, the upper limit speed is set to 50 km/h, the lower limit margin time is set to 4 seconds, and the lane change behavior is prohibited.

Therefore, in a case where the automated driving vehicle 2a is moving within the high-risk area 91a or 91b, the action plan formulation device of the automated driving vehicle 2a prohibits the lane change behavior of the vehicle of interest in response to reception of the risk area notification, thereby setting the behavior allowable range to be narrower than in the case where the vehicle of interest is moving outside the high-risk areas 91a and 91b.

In a case where the automated driving vehicle 2b is moving within the high-risk area 91a or 91b, the action plan formulation device of the automated driving vehicle 2b sets the upper limit speed of the vehicle of interest to 50 km/h that is lower than 70 km/h and prohibits the lane change behavior of the vehicle of interest, in response to reception of the risk area notification, thereby setting the behavior allowable range to be narrower than in the case where the vehicle of interest is moving outside the high-risk areas 91a and 91b.

In a case where the automated driving vehicle 2c is moving within the high-risk area 91a or 91b, the action plan formulation device of the automated driving vehicle 2c sets the upper limit acceleration of the vehicle of interest to 0.1 G that is closer to 0 than 0.2 G, the lower limit acceleration of the vehicle of interest to −0.1 G that is closer to 0 than −0.2 G, and the lower limit margin time of the vehicle to 4 seconds that are longer than 3 seconds, and prohibits the lane change behavior of the vehicle of interest, in response to reception of the risk area notification, thereby setting the behavior allowable range to be narrower than in the case where the vehicle of interest is moving outside the high-risk areas 91a and 91b.

In a case where the automated driving vehicle 2d is moving within the high-risk area 91a or 91b, the action plan formulation device of the automated driving vehicle 2d sets the upper limit acceleration of the vehicle of interest to 0.1 G that is closer to 0 than 0.3 G, the lower limit acceleration of the vehicle of interest to −0.1 G that is closer to 0 than −0.3 G, the upper limit speed of the vehicle of interest to 50 km/h that is lower than 80 km/h, and the lower limit margin time of the vehicle of interest to 4 seconds that is longer than 3 seconds, and prohibits the lane change behavior of the vehicle of interest, in response to reception of the risk area notification, thereby setting the behavior allowable range to be narrower than in the case where the vehicle of interest is moving outside the high-risk areas 91a and 91b.

As described above, in response to reception of the risk area notification, the action plan formulation devices of the automated driving vehicles 2a to 2d moving within the high-risk areas set the behavior allowable ranges of the respective vehicles to a behavior allowable range, which is common to the automated driving vehicles 2a to 2d, is associated with the risk area notification, and is narrower than the behavior allowable ranges set in the case where the respective vehicles are moving outside the high-risk areas, regardless of the difference between the behavior restriction algorithms of the automated driving vehicles.

The traffic safety support system 1 according to the present embodiment and the four-wheeled automobile 2 that is the automated driving vehicle according to the present embodiment exert the following effects.

(1) In the four-wheeled automobile 2 according to the present embodiment, the external information acquisition device 21 acquires external information regarding a state of the surroundings of the four-wheeled automobile 2 as the vehicle of interest, the on-board communication device 23 receives a risk area notification wirelessly delivered from the traffic management server 6 functioning as an information provider device, the action plan formulation device 24 formulates an action plan for the vehicle of interest based on the external information and the risk area notification such that a behavior of the vehicle of interest is prevented from exceeding a predetermined behavior allowable range, and the travel control device 25 operates the travel actuator based on the formulated action plan to cause the vehicle of interest to automatically travel. Here, in a case where the vehicle of interest is moving within a high-risk area indicated by the risk area notification delivered from the traffic management server 6, the action plan formulation device 24 sets the behavior allowable range to a range associated with the risk area notification.

Here, effects exerted by setting the behavior allowable range to the range associated with the risk area notification will be described with reference to FIG. 6. In this case, the behavior of each of the automated driving vehicles 2a to 2d according to the present embodiment is limited to the behavior allowable range that is common to the automated driving vehicles 2a to 2d and is associated with the risk area notification. As a result, each of the vehicles 2a to 2d can accurately grasp the behavior allowable range of the other vehicles, and accordingly, can efficiently formulate a safe action plan with a small processing load, thereby contributing to development of a sustainable transport system. Furthermore, according to the present embodiment, since the behavior allowable range is set to the range associated with the risk area notification only in the high-risk area where many traffic participants are moving in respective directions, the behaviors of the automated driving vehicles 2a to 2d are not unnecessarily limited, whereby the convenience of the users is not impaired.

(2) In the four-wheeled automobile 2 according to the present embodiment, the action plan formulation device 24 narrows the behavior allowable range in the case where the vehicle of interest is moving within the high-risk area, in comparison with a case where the vehicle of interest is moving outside the high-risk area. Due to this feature, in the high-risk area where many traffic participants, including the automated driving vehicles 2a to 2d, are moving in respective directions, each of the automated driving vehicles 2a to 2d can narrow down future positions of the other vehicles, and accordingly, can efficiently formulate a safe action plan with a small processing load.

(3) In the four-wheeled automobile 2 according to the present embodiment, the action plan formulation device 24 narrows the behavior allowable range by setting at least one of the upper limit acceleration or the lower limit acceleration with respect to the acceleration of the vehicle of interest closer to 0. Due to this feature, in the high-risk area where many traffic participants, including the automated driving vehicles 2a to 2d, are moving in respective directions, each of the automated driving vehicles 2a to 2d can narrow down future positions of the other vehicles, and accordingly, can efficiently formulate a safe action plan with a small processing load.

(4) In the four-wheeled automobile 2 according to the present embodiment, the action plan formulation device 24 narrows the behavior allowable range by lowering the upper limit speed with respect to the speed of the vehicle of interest. Due to this feature, in the high-risk area where many traffic participants, including the automated driving vehicles 2a to 2d, are moving in respective directions, each of the automated driving vehicles 2a to 2d can narrow down future positions of the other vehicles, and accordingly, can efficiently formulate a safe action plan with a small processing load.

(5) In the four-wheeled automobile 2 according to the present embodiment, the action plan formulation device 24 narrows the behavior allowable range by increasing the lower limit margin time with respect to the collision margin time between the vehicle of interest and a preceding vehicle. Due to this feature, in the high-risk area where many traffic participants, including the automated driving vehicles 2a to 2d, are moving in respective directions, each of the automated driving vehicles 2a to 2d can narrow down future positions of the other vehicles, and accordingly, can efficiently formulate a safe action plan with a small processing load.

(6) In the four-wheeled automobile 2 according to the present embodiment, the action plan formulation device 24 narrows the behavior allowable range by prohibiting the lane change behavior of the vehicle of interest. Due to this feature, in the high-risk area where many traffic participants, including the automated driving vehicles 2a to 2d, are moving in respective directions, each of the automated driving vehicles 2a to 2d can narrow down future positions of the other vehicles, and accordingly, can efficiently formulate a safe action plan with a small processing load.

(7) In the four-wheeled automobile 2 according to the present embodiment, in a case where the vehicle of interest is moving outside the high-risk area and the target travel route passes through the high-risk area, the navigation device 22 replans the target travel route such that the vehicle of interest bypasses the high-risk area. This feature makes it possible to avoid a situation in which the vehicle of interest enters the high-risk area and the behavior of the vehicle of interest is consequently limited, and thereby contributes to prevention of a further increase in the risk of accident in the high-risk area.

(8) The traffic safety support system 1 according to the present embodiment includes the four-wheeled automobile 2 that is the automated driving vehicle described above, and the traffic management server 6 that delivers the risk area notification to the four-wheeled automobile 2. The traffic management server 6 includes: the target traffic area recognition unit 60 that recognizes, as recognition targets, traffic participants in the target traffic area and traffic environments surrounding the traffic participants, and acquires recognition information regarding the recognition targets; the high-risk area identification unit 61 that identifies the high-risk area in the target traffic area based on the recognition information; the risk area notification generation unit 62 that generates the risk area notification regarding the high-risk area; and the notification transmission unit 63 that delivers the risk area notification to the traffic participants. In the present embodiment, the traffic management server 6 recognizes a state of the target traffic area from a broader point of view, and accordingly, can efficiently identify the high-risk area in the target traffic area.

(9) In the traffic safety support system 1 according to the present embodiment, the high-risk area identification unit 61 identifies, in the target traffic area, a traffic area in which a traffic flow is disturbed as the high-risk area. This feature makes it possible to efficiently identify the high-risk area in the target traffic area.

(10) In the traffic safety support system 1 according to the present embodiment, the notification transmission unit 63 delivers a risk area notification including information regarding the location and range of the high-risk area to the traffic participants. Thus, upon reception of the risk area notification, the four-wheeled automobile 2 can grasp the location and range of the high-risk area.

(11) In the traffic safety support system 1 according to the present embodiment, the notification transmission unit 63 delivers the risk area notification including information regarding the setting values for the behavior allowable range to the traffic participants. That is, in the present embodiment, the traffic safety support system 1, which manages the traffic participants in the target traffic area from a broader point of view as described above, can set the setting values for a common behavior allowable range for each high-risk area, thereby making it possible to set the behavior allowable range to a range suitable for each high-risk area.

(12) In the traffic safety support system 1 according to the present embodiment, the notification transmission unit 63 delivers the risk area notification including information regarding a degree of risk in the high-risk area to the traffic participants. Due to this feature, upon reception of the risk area notification, the four-wheeled automobile 2 can grasp the degree of risk in addition to the location and range of the high-risk area, and thus can set the behavior allowable range to an appropriate range in accordance with the degree of risk.

Second Embodiment

Next, an automated driving vehicle according to a second embodiment of the present invention and a traffic safety support system including the automated driving vehicle will be described with reference to the drawings. In the following, the same components as those of the traffic safety support system 1 according to the first embodiment will not be described or illustrated in detail.

FIG. 7 is a diagram illustrating an example of a target traffic area 9b supported by the traffic safety support system according to the present embodiment.

A traffic management server according to the present embodiment includes a high-risk area identification unit that identifies a high-risk area 91c in the target traffic area 9b by way of the same process as that performed by the high-risk area identification unit 61 according to the first embodiment. Furthermore, the high-risk area identification unit according to the present embodiment divides the identified high-risk area 91c into a core area 92 having a highest degree of risk, a first peripheral area 93a defined around the core area 92 and having a lower degree of risk than the core area 92, and a second peripheral area 93b defined around the first peripheral area 93a and having a lower degree of risk than that of the first peripheral area 93a.

The traffic management server according to the present embodiment includes a risk area notification generation unit that generates a risk area notification including information regarding the location and range of each of the high-risk area 91c, the core area 92, the first peripheral area 93a, and the second peripheral area 93b (hereinafter, referred to collectively as "the high-risk area 91c, etc.") identified by the high-risk area identification unit.

The risk area notification generation unit may generate a risk area notification including information regarding setting values for behavior allowable ranges that are determined respectively for the core area 92 and the peripheral areas 93a and 93b, in addition to the information regarding the locations and ranges of the high-risk area 91c, etc. as described above. In this case, the risk area notification generation unit sets the setting values such that the behavior allowable ranges for the second peripheral area 93b, the first peripheral area 93a, and the core area 92 become narrower in this order. In this case, similarly to the risk area notification generation unit 62 according to the first embodiment, the risk area notification generation unit preferably sets the setting values for the behavior allowable ranges for the areas 92, 93a, 93b by performing simulation on a virtual space.

A notification transmission unit delivers the above-described risk area notification generated by the risk area notification generation unit to traffic participants in the target traffic area.

Figure 8:
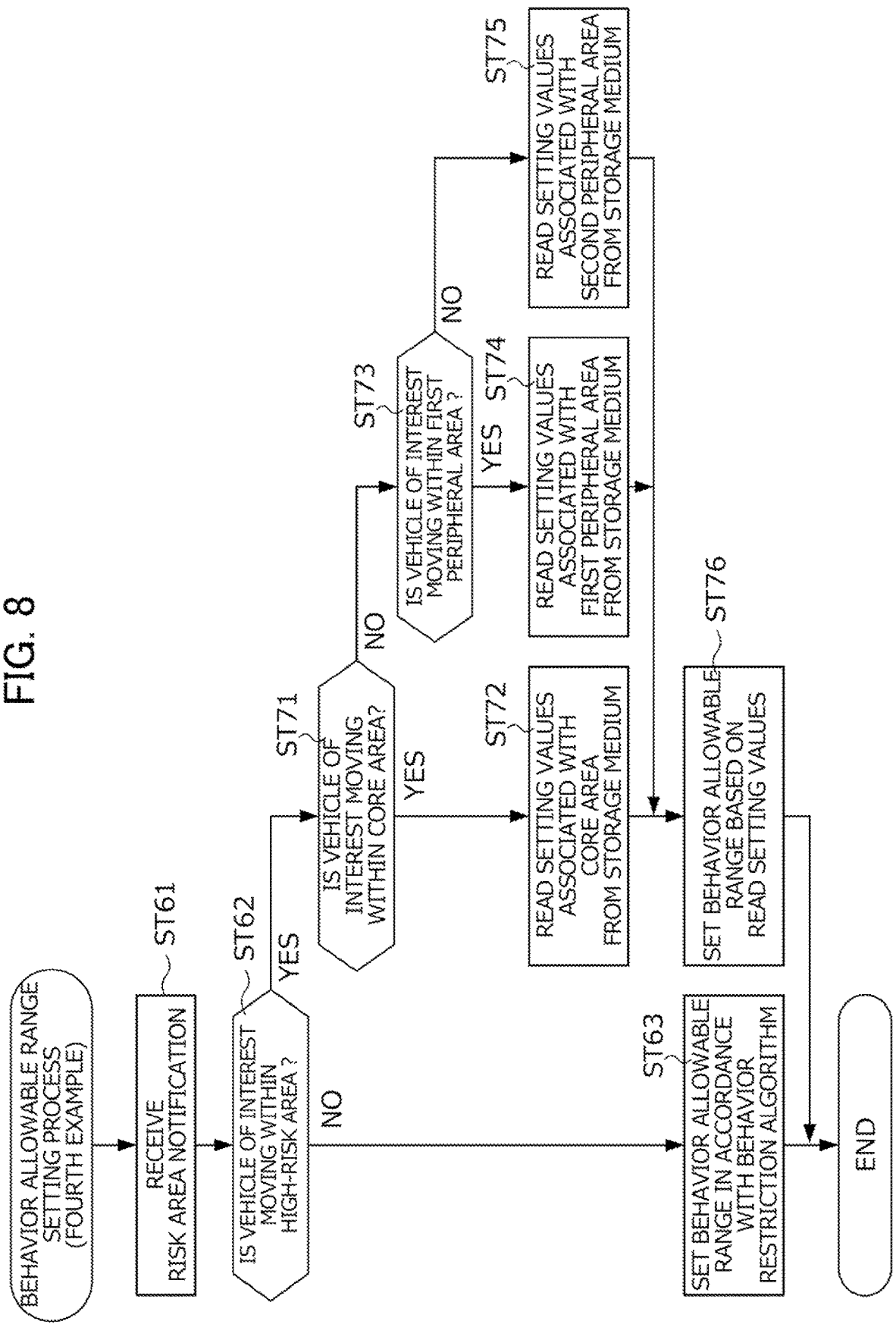
FIG. 8 is a flowchart illustrating a fourth example of the behavior allowable range setting process.

FIG. 8 is a flowchart illustrating a fourth example of a behavior allowable range setting process performed by an action plan formulation device of the automated driving vehicle according to the present embodiment. The behavior allowable range setting process of this example is repeatedly performed by the action plan formulation device in a predetermined control cycle during a period in which the automated driving vehicle as the vehicle of interest is moving. As will be described below, in the fourth example, the action plan formulation device sets a behavior allowable range using the information regarding the locations and ranges of the high-risk area 91C, etc., from among the various information included in the risk area notification delivered from the traffic management server. In the flowchart illustrated in FIG. 8, the processing in Steps ST61 to ST63 is the same as that in Steps ST1 to ST3 of the flowchart in FIG. 3, and a detailed description of Steps ST61 to ST63 will be omitted.

When the determination result in Step ST62 is YES, that is, when the vehicle of interest is moving within the high-risk area 91c, the action plan formulation device proceeds to Step ST71 in order to set the behavior allowable range to a range associated with the risk area notification.

In Step ST71, the action plan formulation device compares a current position of the vehicle of interest with the location and range of the core area 92 indicated by the risk area notification received in Step ST61, and determines whether or not the vehicle of interest is currently moving within the core area 92.

When the determination result in Step ST71 is YES, that is, when the vehicle of interest is moving within the core area 92, the action plan formulation device proceeds to Step ST72. In Step ST72, the action plan formulation device reads setting values of a plurality of behavior restriction parameters associated with the core area 92 from a storage medium (not shown), and proceeds to Step ST76.

When the determination result in Step ST71 is NO, that is, when the vehicle of interest is moving within the high-risk area 91c and outside the core area 92, the action plan formulation device proceeds to Step ST73. In Step ST73, the action plan formulation device compares the current position of the vehicle of interest with the location and range of the first peripheral area 93a indicated by the risk area notification received in Step ST61, and determines whether or not the vehicle of interest is currently moving in the first peripheral area 93a.

When the determination result in Step ST73 is YES, that is, when the vehicle of interest is moving within the first peripheral area 93a, the action plan formulation device proceeds to Step ST74. In Step ST74, the action plan formulation device reads setting values of a plurality of behavior restriction parameters associated with the first peripheral area 93a from the storage medium (not shown), and proceeds to Step ST76.

When the determination result in Step ST73 is NO, that is, when the vehicle of interest is moving within the second peripheral area 93b, the action plan formulation device proceeds to Step ST75. In Step ST75, the action plan formulation device reads setting values of a plurality of behavior restriction parameters associated with the second peripheral area 93b from the storage medium (not shown), and proceeds to Step ST76.

In Step ST76, the action plan formulation device sets the behavior allowable range to a range associated with the area 92, 93a, or 93b by setting the plurality of values of the behavior restriction parameters based on the setting values read in Step ST72, ST74, or ST75, and ends the process illustrated in FIG. 8.

The storage medium stores a plurality of sets of setting values of the plurality of behavior restriction parameters in association with the areas 92, 93a, and 93b. In the storage medium, the setting values of the plurality of behavior restriction parameters are preset such that the behavior allowable ranges for the second peripheral area 93b, the first peripheral area 93a, and the core area 92 become narrower in this order.

More specifically, as illustrated in FIG. 7, in the second peripheral area 93b, the upper limit acceleration is set to 0.3 G, the lower limit acceleration is set to −0.3 G, the upper limit speed is set to 60 km/h, the lower limit margin time is set to 3 seconds, and the lane change behavior is permitted. On the other hand, the behavior allowable range for the first peripheral area 93a is set to be narrower than that for the second peripheral area 93b. More specifically, in the first peripheral area 93a, the upper limit acceleration is set to 0.2 G, the lower limit acceleration is set to −0.2 G, the upper limit speed is set to 40 km/h, the lower limit margin time is set to 3.5 seconds, and the lane change behavior is prohibited. On the other hand, the behavior allowable range for the core area 92 is set to be narrower than that for the first peripheral area 93a. More specifically, in the core area 92, the upper limit acceleration is set to 0.1 G, the lower limit acceleration is set to −0.1 G, the upper limit speed is set to 30 km/h, the lower limit margin time is set to 4 seconds, and the lane change behavior is prohibited. Thus, according to the behavior allowable range setting process illustrated in FIG. 8, when the vehicle of interest is moving within the peripheral area 93a or 93b defined around the core area 92, the behavior allowable range is narrowed as the vehicle of interest approaches the core area 92.

The setting values stored in the storage medium are common and do not depend on the vehicle types or manufacturers. Therefore, according to the behavior allowable range setting process illustrated in FIG. 8, a common behavior allowable range is set for vehicles moving within the area 92, 93a, or 93b regardless of the vehicle types and manufacturers, similarly to the process illustrated in FIG. 3.

The setting values stored in the storage medium are preset such that a behavior allowable range set based thereon will be narrower than a behavior allowable range set based on a behavior restriction algorithm in many situations. Therefore, according to the behavior allowable range setting process illustrated in FIG. 8, the behavior allowable range is set to be narrower when the vehicle of interest is moving within the high-risk area 91c than when the vehicle of interest is moving outside the high-risk area 91c, similarly to the process illustrated in FIG. 3.

Figure 9:
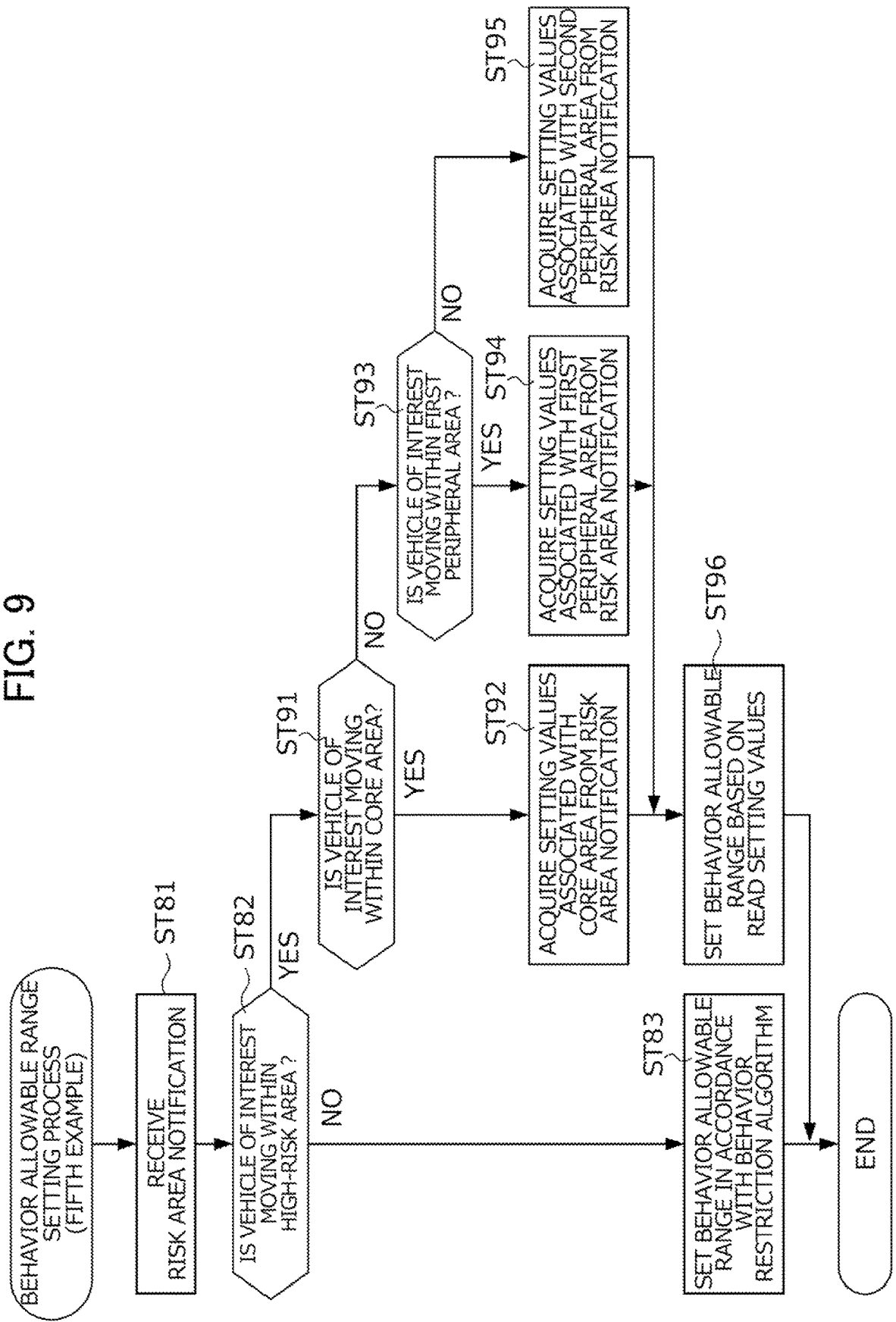
FIG. 9 is a flowchart illustrating a fifth example of the behavior allowable range setting process.

FIG. 9 is a flowchart illustrating a fifth example of the behavior allowable range setting process performed by the action plan formulation device of the automated driving vehicle according to the present embodiment. The behavior allowable range setting process of this example is repeatedly performed by the action plan formulation device in a predetermined control cycle during a period in which the vehicle of interest is moving. As will be described below, in the fifth example, the action plan formulation device sets a behavior allowable range using the information regarding the locations and ranges of the high-risk area 91C, etc., and information regarding setting values of the behavior allowable range, from among the various information included in the risk area notification delivered from the traffic management server. In the flowchart illustrated in FIG. 9, the processing in Steps ST81 to ST83 is the same as that in Steps ST1 to ST3 of the flowchart in FIG. 3, and a detailed description of Steps ST81 to ST83 will be omitted.

When the determination result in Step ST82 is YES, that is, when the vehicle of interest is moving within the high-risk area 91c, the action plan formulation device proceeds to Step ST91 in order to set the behavior allowable range to a range associated with the risk area notification.

In Step ST91, the action plan formulation device compares a current position of the vehicle of interest with the location and range of the core area 92 indicated by the risk area notification received in Step ST81, and determines whether or not the vehicle of interest is currently moving within the core area 92.

When the determination result in Step ST91 is YES, that is, when the vehicle of interest is moving within the core area 92, the action plan formulation device proceeds to Step ST92. In Step ST92, the action plan formulation device acquires setting values of a plurality of behavior restriction parameters associated with the core area 92 from the risk area notification received in Step ST81, and proceeds to Step ST96.

When the determination result in Step ST91 is NO, that is, when the vehicle of interest is moving within the high-risk area 91c and outside the core area 92, the action plan formulation device proceeds to Step ST93. In Step ST93, the action plan formulation device compares a current position of the vehicle of interest with the location and range of the first peripheral area 93a indicated by the risk area notification received in Step ST81, and determines whether or not the vehicle of interest is currently moving within the first peripheral area 93a.

When the determination result in Step ST93 is YES, that is, when the vehicle of interest is moving within the first peripheral area 93a, the action plan formulation device proceeds to Step ST94. In Step ST94, the action plan formulation device acquires setting values of a plurality of behavior restriction parameters associated with the first peripheral area 93a from the risk area notification received in Step St81, and proceeds to Step ST96.

When the determination result in Step ST93 is NO, that is, when the vehicle of interest is moving within the second peripheral area 93b, the action plan formulation device proceeds to Step ST95. In Step ST95, the action plan formulation device acquires setting values of a plurality of behavior restriction parameters associated with the second peripheral area 93b from the risk area notification received in Step ST81, and proceeds to Step ST96.

In Step ST96, the action plan formulation device sets the behavior allowable range to a range associated with the area 92, 93a, or 93b by setting the plurality of values of the behavior restriction parameters based on the setting values acquired in Step ST92, ST94, or ST95, and ends the process illustrated in FIG. 9.

As described above, the risk area notification generation unit of the traffic management server sets the setting value such that the behavior allowable ranges for the second peripheral area 93b, the first peripheral area 93a, and the core area 92 become narrower in this order. Thus, according to the behavior allowable range setting process illustrated in FIG. 9, when the vehicle of interest is moving within the peripheral area 93a or 93b defined around the core area 92, the behavior allowable range is narrowed as the vehicle of interest approaches the core area 92.

Here, the traffic management server delivers a common risk area notification to the traffic participants in the target traffic area regardless of the vehicle types and manufacturers. Therefore, according to the behavior allowable range setting process illustrated in FIG. 9, a common behavior allowable range is set for vehicles moving within the area 92, 93a, or 93b regardless of the vehicle types and manufacturers.

The risk area notification generation unit 62 of the traffic management server sets the setting values of the plurality of behavior restriction parameters such that a behavior allowable range set based on the plurality of behavior restriction parameters will be narrower than a behavior allowable range set based on the behavior restriction algorithm in many situations. Therefore, according to the behavior allowable range setting process illustrated in FIG. 9, the behavior allowable range is set to be narrower when the vehicle of interest is moving within the high-risk area 91c than when the vehicle of interest is moving outside the high-risk area 91c.

The automated driving vehicle and the traffic safety support system according to the present embodiment exert the following effects.

(13) In the automated driving vehicle according to the present embodiment, when the vehicle of interest is moving within the peripheral area 93a or 93b where the risk is relatively low in the the high-risk area, the action plan formulation device narrows the behavior allowable range as the vehicle of interest approaches the core area 92. This feature makes it possible to ensure safety for many traffic participants that are moving in respective directions in the high-risk area 91c, while preventing the behavior of the vehicle of interest from being abruptly limited.

While embodiments of the present invention have been described above, the present invention is not limited to the above embodiments. The specifics of the present invention may be modified as appropriate without deviating from the spirit of the present invention.

It should be noted that in the above embodiment, the case has been described in which the traffic management server 6 functions as an information provider device and wirelessly delivers the risk area notification to the automated driving vehicles. However, the present invention is not limited to the case. The present invention may be modified such that in the target traffic area, a traffic monitoring device is installed as the information provider device in a specific traffic area in which an accident is likely to occur, and the traffic monitoring device may transmit a risk area notification to automated driving vehicles present within the specific traffic area.

What is claimed is:

1. A traffic safety support system comprising:
an external information acquirer configured to acquire external information regarding a state of surroundings of the automated driving vehicle as a vehicle of interest;
an information provider connected to the vehicle of interest via wireless communication;
an on-board communicator configured to receive a risk area notification regarding a high-risk area in a target traffic area, the risk area notification being wirelessly transmitted from an the information provider;
an action plan formulator configured to formulate, based on the external information and the risk area notification, an action plan for the vehicle of interest such that a behavior of the vehicle of interest is prevented from exceeding a predetermined behavior allowable range; and
a travel controller configured to operate a travel actuator based on the action plan to cause the vehicle of interest to automatically travel, wherein
the information provider comprising:
a target traffic area recognizer configured to recognize, as recognition targets, traffic participants in the target traffic area and traffic environments surrounding the traffic participants, and acquire recognition information regarding the recognition targets, and
a high-risk area identifier configured to identify the high-risk area in the target traffic area based on the recognition information,
in a case where the vehicle of interest is moving within the high-risk area, the action plan formulator sets the behavior allowable range to a range associated with the risk area notification, and
the high-risk area identifier identifies a local traffic area in the target traffic area where a traffic volume calculated based on the recognition information deviates from a predetermined standard traffic volume by a predetermined value or more as the high-risk area.

2. The traffic safety support system according to claim 1, wherein
the action plan formulator narrows the behavior allowable range in the case where the vehicle of interest is moving within the high-risk area, in comparison with a case where the vehicle of interest is moving outside the high-risk area.

3. The traffic safety support system according to claim 2, wherein
the action plan formulator narrows the behavior allowable range by setting at least one of an upper limit acceleration or a lower limit acceleration with respect to an acceleration of the vehicle of interest closer to 0, the upper limit acceleration being a positive value, the lower limit acceleration being a negative value.

4. The traffic safety support system according to claim 2, wherein
the action plan formulator narrows the behavior allowable range by lowering an upper limit speed with respect to a speed of the vehicle of interest.

5. The traffic safety support system according to claim 2. wherein
the action plan formulator narrows the behavior allowable range by increasing a lower limit margin with respect to an inter-vehicle margin between the vehicle of interest and a preceding vehicle.

6. The traffic safety support system according to claim 2. wherein
the action plan formulator narrows the behavior allowable range by prohibiting a lane change behavior of the vehicle of interest.

7. The traffic safety support system according to claim 2, wherein
the high-risk area is divided into a core area and a peripheral area that is defined around the core area and has a lower risk than the core area, and
in a case where the vehicle of interest is moving within the peripheral area, the action plan formulator narrows the behavior allowable range as the vehicle of interest approaches the core area.

8. The traffic safety support system according to claim 1, further comprising:

a navigator configured to plan a target travel route for the vehicle of interest, wherein the action plan formulator formulates the action plan such that the vehicle of interest moves along a road specified by the target travel route, and in a case where the vehicle of interest is moving outside the high-risk area and the target travel route passes through the high-risk area, the navigator replans the target travel route such that the vehicle of interest bypasses the high-risk area.

9. The traffic safety support system according to claim 1, wherein the information provider further comprising:

a risk area notification generator configured to generate a risk area notification regarding the high-risk area, and a notification transmitter configured to transmit the risk area notification to the traffic participants.

10. The traffic safety support system according to claim 9, wherein the high-risk area identifier identifies the local traffic area where the traffic volume calculated based on the recognition information deviates from the standard traffic volume by the predetermined value or more for a predetermined period of time as the high-risk area.

11. The traffic safety support system according to claim 9, wherein the risk area notification includes information regarding a location and a range of the high-risk area.

12. The traffic safety support system according to claim 11, wherein the risk area notification further includes information regarding a setting value for the behavior allowable range.

13. The traffic safety support system according to claim 11, wherein the risk area notification further includes information regarding a degree of risk in the high-risk area.

* * * * *